US00RE46349E

(19) United States
(12) Reissued Patent
Golinveaux

(10) Patent Number: US RE46,349 E
(45) **Date of Reissued Patent: *Mar. 28, 2017**

(54) RESIDENTIAL DRY SPRINKLER DESIGN METHOD AND SYSTEM

(71) Applicant: Tyco Fire Products LP, Lansdale, PA (US)

(72) Inventor: James E. Golinveaux, N. Kingstown, RI (US)

(73) Assignee: Tyco Fire Products LP, Lansdale, PA (US)

( * ) Notice: This patent is subject to a terminal disclaimer.

(21) Appl. No.: 14/245,832

(22) Filed: Apr. 4, 2014

Related U.S. Patent Documents

Reissue of:
(64) Patent No.: 7,712,543
Issued: May 11, 2010
Appl. No.: 10/874,758
Filed: Jun. 24, 2004

(51) Int. Cl.
*A62C 2/00* (2006.01)
*A62C 35/62* (2006.01)

(52) U.S. Cl.
CPC ..... *A62C 35/62* (2013.01)

(58) Field of Classification Search
CPC ..... A62C 35/62; A62C 35/64; A62C 35/645; A62C 35/10; A62C 35/60; A62C 35/68; A62C 37/08; A62C 37/11; A62C 31/00; A62C 31/05; A62C 31/02
See application file for complete search history.

(56) References Cited

U.S. PATENT DOCUMENTS 171,305 A * 12/1875 Newton ..... 169/17
231,711 A * 8/1880 Grinnell ..... 169/20
237,517 A 2/1881 Granger
260,192 A 6/1882 Granger
269,205 A * 12/1882 Grinnell ..... 169/17
269,227 A * 12/1882 Parmalee ..... 169/17
558,259 A * 4/1896 Cook ..... A62C 35/645 169/20

(Continued)

FOREIGN PATENT DOCUMENTS

DE 39 38 394 A1 5/1991
WO WO 03/100555 A2 12/2003

(Continued)

OTHER PUBLICATIONS

Design and Layout of Fire Sprinkler Systems, CRC Press, 2001.*

(Continued)

*Primary Examiner* — Patricia Engle
(74) *Attorney, Agent, or Firm* — Perkins Coie LLP

(57) ABSTRACT

A method of designing a residential fire protection system in a residential dwelling unit are shown and described. The residential dwelling unit has a plurality of compartments as defined in the 2002 National Fire Protection Association Standards 13, 13D, and 13R. The method can be achieved by: determining a minimum quantity and location of residential fire sprinklers required to determine a hydraulic demand calculation of the residential fire sprinklers of a piping network filled with water and arranged to protect the plurality of compartments; and specifying the minimum quantity and location of residential fire sprinklers in a piping network filled with a gas. Various aspects of the invention are also shown and described.

56 Claims, 4 Drawing Sheets

(56) References Cited

U.S. PATENT DOCUMENTS

| | | | | | |
|---|---|---|---|---|---|
| 558,653 | A * | 4/1896 | Miller | A62C 35/645 169/17 |
| 4,361,189 | A | 11/1982 | Adams | |
| 4,366,865 | A * | 1/1983 | Makibbin | 169/16 |
| 4,375,637 | A | 3/1983 | Desjardins | |
| 5,027,905 | A | 7/1991 | Cousineau et al. | |
| 5,099,925 | A | 3/1992 | Glidden et al. | |
| 5,169,177 | A * | 12/1992 | McLennan | A62C 35/68 285/197 |
| 5,236,049 | A | 8/1993 | Asselin et al. | |
| 5,366,022 | A * | 11/1994 | Meyer | A62C 37/09 169/16 |
| 5,609,211 | A * | 3/1997 | Meyer et al. | 169/37 |
| 5,720,351 | A | 2/1998 | Beukema et al. | |
| 5,727,737 | A * | 3/1998 | Bosio | B05B 1/262 169/37 |
| 5,775,431 | A * | 7/1998 | Ondracek | A62C 37/14 169/37 |
| 5,865,256 | A * | 2/1999 | Pounder | A62C 37/14 169/37 |
| 5,971,080 | A | 10/1999 | Loh et al. | |
| 6,076,608 | A * | 6/2000 | MacDonald, III | A62C 35/68 138/118 |
| 6,195,002 | B1 | 2/2001 | Evans, Jr. et al. | |
| 6,516,893 | B2 * | 2/2003 | Pahila | 169/37 |
| 6,848,513 | B2 | 2/2005 | Jackson et al. | |
| 2002/0185282 | A1 * | 12/2002 | Kretschmer | A62C 35/60 169/43 |
| 2002/0185548 | A1 * | 12/2002 | Pahila | A62C 37/14 239/37 |
| 2006/0021759 | A1 | 2/2006 | Golinveaux | |
| 2006/0021760 | A1 | 2/2006 | Golinveaux | |
| 2006/0021761 | A1 | 2/2006 | Golinveaux | |
| 2006/0021762 | A1 | 2/2006 | Golinveaux | |
| 2006/0021763 | A1 | 2/2006 | Golinveaux | |
| 2006/0021765 | A1 | 2/2006 | Golinveaux | |
| 2006/0021766 | A1 | 2/2006 | Golinveaux | |

FOREIGN PATENT DOCUMENTS

| | | |
|---|---|---|
| WO | WO 2006/002435 | 1/2005 |
| WO | WO 2006/014906 | 2/2006 |

OTHER PUBLICATIONS

NIBCO, BlazeMaster CPVC Fire Sprinkler Systems: Installation and Design Manual, Nov. 2006.*

A Century of Safety Standards, "UL 1626; Residential Sprinklers for Fire-Protection Service"; ISBN 0-7629-0688-X (Oct. 2, 2003).

Reexamination U.S. Appl. No. 95/002,148, filed Sep. 11, 2012.

Reexamination U.S. Appl. No. 95/002,149, filed Sep. 11, 2012.

National Fire Protection Association, "NFPA 13: Installation of Sprinkler Systems" (2002 edition).

National Fire Protection Association, "NFPA 13D: Standard for the Installation of Sprinkler Systems in One- and two-Family Dwellings and Manufactured Homes" (2002 edition).

National Fire Protection Association, "NFPA 13R: Standard for the Installation of Sprinkler Systems in Residential Occupancies up to and Including Four Stories in Height" (2002 edition).

Underwriters Laboratory, "2003 Fire Protection Equipment Directory" (pp. 484-489).

Reissue U.S. Appl. No. 14/245,748, filed Apr. 4, 2014.

Warnock Hershey Professional Services, Ltd, "Report No. 6482—Report of: Evaluation of Residential Sprinklers For Dry System Installation" (Jul. 1992).

Warnock Hershey Professional Services, Ltd, "Report No. 6483—Report of: Evaluation of Residential Sprinklers For Dry System Installation" (Jul. 1992).

Pyrotech Fire Sprinkler Systems, Ltd., "Dry Pipe Sprinkler Control Panel—Installation and Operating Instructions."

Underwriters Laboratores, Inc. "Residential Sprinklers For Fire-Protection Service—UL 1626" Chs. 23-25.4, pp. 14-20 (Apr. 26, 1988).

"Residential Sprinklers for Fire-Protection Service", UL 1626, Third Edition, Underwriters Laboratories Inc., (Oct. 2003), 59 pages.

"Residential Fire Protection System", www.tyco-fireproducts.com, May 2004, 12 pages.

"Model F1 Residential Sprinklers", Bulletin 139 Rev. S, Reliable Automatic Sprinkler Co., Inc., (Aug. 2002), 4 pages.

"Model F1/RES CCP Residential Sprinkler", Bulletin 141E, Reliable Automatic Sprinkler Co., Inc. (Sep. 2000), 4 pages.

"Model F4/RES Concealed Residential Sprinkler", Bulletin 126 Rev. F, Reliable Automatic Sprinkler Co., Inc., (Jun. 2002), 2 pages.

"Residential Sprinkler Wall Wetting Patterns", Bulletin 007, Reliable Automatic Sprinkler Co., Inc., (Mar. 2004) 16 pages.

"Residential Sprinklers For Sloped Ceilings", Bulletin 035 Rev. C, Reliable Automatic Sprinkler Co., Inc., (Mar. 2004), 12 pages.

Model RFC43 Concealed Residential Sprinkler (SIN RA0612), Bulletin 006, Reliable Automatic Sprinkler Co., Inc., (Mar. 2004), 4 pages.

"V27,K4.9 Models V2730 and V2732 Residential Pendant, Recessed Pendent and Specific Application (Flat & Sloped Ceilings) Quick Response", Victaulic, (Jan. 2003), 4pp.

V29,K4.1 Model V2902 Residential Adjustable Flush Pendent and Specific Application (Flat & Sloped Ceilings) Quick Response, Victaulic, (Jan. 2003), 4 pages.

"Model F3QR Quick Response Dry Sprinklers", Bulletin 157, Reliable Automatic Sprinkler Co., Inc., (Aug. 2003) 6 pages.

"R3sidential Sprinkler Installation Guide", Bulletin 140F, Reliable Automatic Sprinkler Co., Inc. (Sep. 2000), 12 pages.

"Residential Sprinklers—Table of Contents" (date unknown) from www.tyco-fireproducts.com/TFP_CSC/td_section.php?B=CSC&S=S4.

"Preaction System, Supervised Single Interlock 2½ Inch (65mm)", Grinnell Corporation, (Mar. 1995), 8 pages.

"Instructions for Installation and Operation for Single Interlock Preaction Systems With Dual Solenoid Actuation Of Pneumatic Pilot Release", Bulletin 717A, www.reliablesprinkler.com, (date unknown), 14 pages.

"Viking Model B-1 Par-3 Microprocessor Release Control Panel", www.vikingcorp.com, (1997), 1 p.

"Model AMD-2 Automatic Air Maintenance Device Compressor Control Type With Field Adjustable Pressure Switch", Tyco Fire & Building Products, (Jan. 2003), 4 pages.

"Preaction System, Double Interlock Electric/Pneumatic Release Model F470-4 and 6 inch (100 and 150 mm)", Grinnell Corporation, (Jan. 1996), 11 pages.

"Preaction System, Double Interlock Electric/Electric Release Model F445-2½ Inch (65mm)", Grinnell Corporation, (Nov. 1997), 8 pages.

"Preaction System with Model DV-5 Deluge Valve Single Interlock, Supervised—Electric Actuation 1½ thru 8 Inch (DN40 thru DN200)", Tyco Fire & Building Products, (TFP1420, Mar. 2004), 14 pages.

"Model PS10A Pressure Switch", Potter Electric Signal Company, (Mar. 1999), 2 pages.

"Chemetron, Heat Detectors Series 600", Potter Electric Signal Company, (Mar. 1999), 2 pages.

"Wheelock Series MT and MT Strobe Multitone Electronic Signals", Potter Electric Signal Company, (Mar. 1999), 2 pages.

"Model AMD-1 Automatic Air Maintenance Device Pressure Reducing Type With Field Adjustable Pressure Regulator", Tyco Fire & Building Products, (TFP1221, Apr. 2003), 4 pages., No. 27-40.

"Ball Valves", F19—1-92, Central Sprinkler Company, (1998), 2 pages.

"Air Compressors for Fire Protection Systems—List Price Sheet", General Blower Company, Inc., (May 1992), 2 pages.

"Skinner Valve 7000 Series Two-Way Solenoid Valves", Honeywell Inc., (Form No. C7000292, Mar. 1994), 3 pages.

"PFC—4410 Releasing Control Panel", Potter Electric Signal Company, (Mar. 1999), 2 pages.

(56) References Cited

OTHER PUBLICATIONS

"Instructions for Installation, Operation, Care and Maintenance, Supertrol Single Interlock Preaction System 2½ Inch (65mm)", Bulletin 715B, Reliable Automatic Sprinkler Co., Inc., (May 2000), 8 pages.
"Dry Pipe Valve—2 and 3 Inch (50 and 80 mm, Model F 3061 (Flangex Groove)", Grinnell Corporation, (Jun. 1997), 11 pages.
"Sprinkler Systems—One and Two-Family Dwellings," NFPA 13D, 1975, 21 pages.
"Standard for the Installation of Sprinkler Systems in One- and Two-Family Dwellings and Mobile Homes," NFPA 13D, 1980, 20 pages.
"Standard for the Installation of Sprinkler Systems,"NFPA 13, 1983 Edition, pp. 13-1 and 13-56 and 57, 2 pages.
"Automatic Sprinkler Systems Handbook", Robert M. Hodnett, First Edition, National Fire Protection Association, Inc., Quincy, MA, 99 pages, 1983 Edition.
1984 Fall Meeting, Technical Committee Documentation, National Fire Protection Association, Inc., Quincy, MA, 18 pages.
1984 Fall Meeting, Technical Committee Reports, National Fire Protection Association, Inc., Quincy, MA, 49 pages.
"Standard for the Installation of Sprinkler Systems," NFPA 13, pp. 13-1, 13-12, 13-13, and 13-29, 1985 Edition.
"Standard for the Installation of Sprinkler Systems," NFPA 13, 1989 Edition, p. 13-33, Section 3-11.2.9, 1 page.
"Automatic Sprinkler Systems Handbook", Robert M. Hodnett, Second Edition, National Fire Protection Association, Quincy, MA, 175 pages, 1985 Edition.
"Automatic Sprinkler Systems Handbook", Robert E. Solomon, P.E., Fourth Edition, National Fire Protection Association, Quincy, MA 128 pages, 1989 Edition.
1991 Annual Meeting, Technical Committee Documentation (Comments), National Fire Protection Association, Quincy, MA, (1991), 164 pages.
1991 Annual Meeting, Technical Committee Reports, National Fire Protection Association, Quincy, MA, (1990), 119 pages.
"Standard for the Installation of Sprinkler Systems," NFPA 13, 1991 Edition, p. 13-31, Sections 4-3.6.1 and 4-3.6.2, 1 page.
"Standard for the Installation of Sprinkler Systems In Residential Occupancies Up to And Including Four Stories in Height," NFPA 13R, p. 13R-11, 1991 Edition.
"Automatic Sprinkler Systems Handbook", Robert E. Solomon, P.E., Fifth Edition, National Fire Protection Association, Quincy, MA 150 pages, 1991 Edition.
"Standard for the Installation of Sprinkler Systems," NFPA 13, 2002 Edition.
"Standard for the Installation of Sprinkler Systems in One-AndTwo-Family Dwellings and Manufactured Homes" 13D, 2002 Edition.
"Standard for the Installation of Sprinkler Systems in Residential Occupancies Up to And Including Four Stories in Height" 13R, 2002 Edition.
Russell P. Fleming P.E., NFPA Journal, "Predicting Water Delivery in Dry Pipe Systems" at 24, 108 (Jul./Aug. 2002).
John K. Bouchard, editor, Automatic Sprinkler Systems Handbook: Third Edition at 177-178 (1987 NFPA, Inc.).
Russell P. Fleming, P.E., editor, vol. VIII No. 1 International SprinklerScene, pp. 1-4 (Jan.-Apr. 1999 National Fire Sprinkler Assoc., Inc.).
Russ Flemming, editor, vol. II, No. 1 Sprinkler Technotes, pp. 1-6 (Jan.-Feb. 1979 National Automatic Sprinkler & Fire Control Assoc., Inc.).
James Golinveaux, "A Technical Analysis: Variables That Affect The Perofrmance of Dry Pipe Systems" pp. 1-24 (Sep. 2002 Tyco Fire & Building Prods.).
James Golinveaux, Residential Sprinklers: Used In NFPA 13, 2002 Applications—A Technical Analysis: Listings and Applications of Residential Sprinklers and the 0.1 GPM/Ft2.
—Minimum Density Requirement pp. 1-27 (Dec. 2004 Tyco Fire & Building Prods.).
James Golinveaux, "A Technical Analysis: Listings and Applications of Residential Sprinklers" pp. 1-20 (Mar. 2003 Tyco Fire & Building Prods.).
ANSI/NFPA13 An American National Standard, "NFPA 13: Installation of Sprinkler Systems 1983"—Ch. 2, Sections 2-1 to 2-3.1.2 at 13-20, 13-21 (1983 NFPA, Inc.).
International Search Report & Written Opinion For PCT/US05/22875, Dec. 11, 2006, Tyco Fire Products LP.
International Search Report & Written Opinion For PCT/us05/26405, Oct. 1, 2006, Tyco Fire Products LP.
Letter from Abelman, Frayne & Schwab; Appendix A (1-9); Appendix B (May 9, 2007) (74 pages).
International Preliminary Report on Patentability of PCT/US2005/022875 (Feb. 13, 2007) (7 pages).
International Preliminary Report on Patentability for PCT/US2005/026405 (Jan. 30, 2007) (6 pages).

* cited by examiner

RESIDENTIAL DRY SPRINKLER DESIGN METHOD AND SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

An automatic sprinkler system is one of the most widely used devices for fire protection. These systems have sprinklers that are activated once the ambient temperature in an environment, such as a room or a building, exceeds a predetermined value. Once activated, the sprinklers distribute fire-extinguishing fluid, preferably water, in the room or building. A sprinkler system, depending on its specified configuration is considered effective if it controls or suppresses a fire. Failures of such systems may occur when the system has been rendered inoperative during building alteration or disuse, or the occupancy hazard has been increased beyond initial system capability.

The sprinkler system can be provided with a water supply (e.g., a reservoir or a municipal water supply). Such supply may be separate from that used by a fire department. Regardless of the type of supply, the sprinkler system is provided with a main that enters the building to supply a riser. Connected at the riser are valves, meters, and, preferably, an alarm to sound when water flow within the system exceeds a predetermined minimum. At the top of a vertical riser, a horizontally disposed array of pipes extends throughout the fire compartment in the building. Other risers may feed distribution networks to systems in adjacent fire compartments. Compartmentalization can divide a large building horizontally, on a single floor, and vertically, floor to floor. Thus, several sprinkler systems may serve one building.

In a piping distribution network, branch lines carry the sprinklers. A sprinkler may extend up from a branch line, placing the sprinkler relatively close to the ceiling, or a sprinkler can be pendent below the branch line. For use with concealed piping, a flush-mounted pendant sprinkler may extend only slightly below the ceiling.

The sprinkler system can be provided in various configurations. In a wet-pipe system, used for example, in buildings having heated spaces for piping branch lines, all the system pipes contain a fire-fighting fluid, such as, water for immediate release through any sprinkler that is activated. In a dry-pipe system, used for example, in unheated open areas, cold rooms, passageways, or other areas exposed to freezing, such as unheated buildings in freezing climates or for cold-storage rooms, the pipes, risers, and feed mains, disposed, branch lines and other distribution pipes of the fire protection system may contain a dry gas (air or nitrogen or mixtures thereof) under pressure. A valve is sued to separate the pipes that contain a dry gas and pipes that contain a fire-fighting fluid, such as, water. In some application, the pressure of gas holds closed a dry pipe valve at the riser. When heat from a fire activates a sprinkler, the gas escapes and the dry-pipe valve trips; water enters branch lines; and fire fighting begins as the sprinkler distributes the water. By its nature, a dry sprinkler system is slower to respond to fire conditions than a wet system because the dry gas must first be exhausted from the system before the fire-fighting fluid is expelled from the fire sprinkler. Such delay creates a "water delivery time" to the sprinkler. The water delivery time introduces an additional variable for consideration in a design for fire protection with a dry pipe system.

Various standards exist for the design and installation of a fire protection system. In particular, the National Fire Protection Association ("NFPA") describes, in its Standard for the Installation of Sprinkler Systems 13 (2002) ("the NFPA Standard 13") various design consideration and installation parameters for a fire protection system, which standard is incorporated herein by reference in its entirety. One of many design considerations provided by NFPA Standard 13 is the number of fire sprinklers to be used in a fire protection system. For a wet system, the NFPA Standard 13 describes at A.14.4.4 that a quantity of fire sprinklers can be determined either by a design area calculation or by a specified minimum number of sprinklers.

NFPA Standard 13 also addresses certain design considerations for dry pipe fire protection systems by modifying the design of the wet pipe system. For example, in a dry pipe system, NFPA Standard 13 states, for commercial storage (NFPA Standard 13, 12.1.6.1) and dry pipe system generally (NFPA Standard 13, 14.4.4.4.2), that a design area for a dry pipe system is to be increased 30% over the design area for the wet system in such applications so that the quantity of fire sprinklers for a dry pipe system is increased by generally 30% over the same quantity of fire sprinklers in a wet system. Where Large-Drop Sprinklers are utilized in commercial fire protection, NFPA shows (at Table 12.3.2.2.1(b) and 12.3.4.2.1) that an increased in the specified number of sprinklers is (e.g., 50% or more) is required when a dry pipe system is utilized instead of a wet pipe for these sprinklers. When a commercial fire sprinkler is used with a dry pipe instead of a wet pipe system in dwelling applications, the design area must be increased by 30% so that the number of these sprinklers must be increased, and thus, the hydraulic demand is increased. It is apparent from NFPA Standard 13 that, holding all other design parameters constant, the use of a dry pipe system instead of a wet pipe system would require a relatively large increase in the number of fire sprinklers, which would increase the hydraulic demand of the dry pipe system.

Although NFPA Standard 13 refers in broad terms to wet pipe and dry pipe systems, NFPA Standard 13 is generally silent as to design and installation criteria for dry pipe residential sprinkler systems. For example, NFPA Standard 13 fails to specify any criteria in a design of a dry pipe residential fire sprinkler system, including a hydraulic demand calculation, the quantity of residential fire sprinklers consonant with the hydraulic demand calculation or installation constraints and use of residential fire sprinklers in a dry pipe fire protection system. In fact, NFPA Standard 13 (2002) specifically prohibits residential fire sprinklers from being used in any system other than wet unless the residential fire sprinklers are listed for such other applications, as stated in NFPA Standard 13 at 8.4.5.2:

> [R]esidential sprinklers shall be used only in wet systems unless specifically listed for use in dry pipe systems or preaction systems. (Emphasis Added).

NFPA provides separate standards for design and installation of wet pipe fire protection system in residential occupancies. Starting in 1975, NFPA provides the Standard for the Installation of Sprinkler Systems in One-And Two-Family Dwellings and Manufactured Homes 13D ("NFPA Standard 13D"). Due in part to the increasingly urbanized nature of cities, NFPA promulgated, in 1989, another standard in recognition of low-rise residential facilities, entitled Standard for the Installation of Sprinkler Systems in Residential Occupancies Up to And Including Four Stories in Height 13R ("NFPA Standard 13R"). The latest respective editions of NFPA Standard 13D and 13R are the 2002 Edition of NFPA Standard 13 and 13R, which are incorporated by reference herein in their entirety. Starting in 1988, Underwriters Laboratory ("UL") provides for additional requirements that residential fire sprinklers must meet for residential fire protection systems as set forth in its Underwriter's Laboratory Residential fire sprinklers for Fire-Protection Service 1626 ("UL Standard 1626"). The most recent edition of UL Standard 1626 is the October 2003 edition, which is incorporated by reference herein in its entirety.

NFPA and UL provide similar water density requirement for residential fire protection systems. NFPA Standard 13 (2002) states (Chap 11.2.3.5.2) that a density for a protection area of a residential occupancy with a generally flat ceiling as the greater of (a) 0.1 gallons per minute per square feet of the four most hydraulically demanding sprinkler over a design area or (b) a listed residential minimum density. The listed residential minimum density can be found in either NFPA Standard 13D or 13R (2020). NFPA Standard 13D (2002) states (Chapter 8.1.1.2.2 and 8.1.2) that fire sprinklers listed for residential use shall have minimum discharge density of 0.05 gallons per minute per square feet to the design sprinklers, where the number of design sprinklers includes all of the sprinklers, up to a maximum of two, that requires the greatest hydraulic demand, within a compartment that has generally flat and smooth ceiling. NFPA Standard 13R (2002) states (Chapter 6.7.1.1.2.2. and 6.7.1.2) that fire sprinklers listed for residential use shall have minimum discharge density of 0.05 gallons per minute per square feet to the design sprinklers, where the number of design sprinklers includes all of the sprinklers, up to a maximum of four, that requires the greatest hydraulic demand, within a compartment that has generally flat and smooth ceiling. UL Standard 1626 (October 2003), on the other hand, states (at Table 6.1) that the density for a coverage area with a generally flat ceiling as 0.05 gallons per minute per square feet minimum.

Although NFPA Standards 13R and 13D provide considerable flexibility in the design and installation of wet pipe residential fire protection system, these standards are strict in prohibiting any existing residential fire sprinklers that are approved for use in a wet pipe residential system from being used in any application other than a wet system. In particular, both NFPA Standard 13R and 13D (2002) reiterate the stricture stated NFPA Standard 13 (2002), which prohibits the use of residential sprinklers for systems other than wet pipe by stating, at paragraphs 6.6.7.1.2 and 7.5.2, respectively, that:

> [R]esidential sprinklers shall not be used on systems other than wet pipe systems unless specifically listed for use on that particular type of system. (Emphasis Added).

While these standards may have considered a residential piping system other than a wet pipe system, e.g., a dry pipe residential system, the standards do not provide any indication of how to determine a hydraulic demand as part of a design of such systems. Furthermore, because of the guidelines in the standards regarding the use of dry pipe instead of wet pipe, those desiring to use a dry pipe sprinkler system in non-residential applications would normally increase the hydraulic demand of the dry pipe system over that of the wet pipe system, either by an increase in the design area or the number of sprinklers based on the wet pipe system. Currently, it is believed that no residential fire sprinkler is approved for a dry pipe system in residential applications. Thus, design methodologies and installation requirements for applications other than wet pipe fire sprinkler systems in residential applications are believed to be notably lacking.

SUMMARY OF THE INVENTION

The present invention provides, in one aspect, a method of designing a dry pipe residential fire protection system in a residential dwelling unit. The residential dwelling unit has a plurality of compartments as defined in the 2002 National Fire Protection Association Standards 13, 13D, and 13R. The method can be achieved by determining a minimum quantity and location of residential fire sprinklers required to determine a hydraulic demand calculation of the residential fire sprinklers of a piping network filled with water and arranged to protect the plurality of compartments. Specifying that the minimum quantity and location of residential fire sprinklers, as determined for a wet piping network, is used to determine the hydraulic demand of in a piping network filled with a gas and arranged to protect the plurality of compartments of the residential dwelling unit.

In yet another aspect of the present invention, a fire protection system residential dwelling unit fire protection system is provided. The residential dwelling unit has a plurality of compartments as defined in the 2002 National Fire Protection Association Standard 13D. The system includes a supply of pressurized fluid, a network of pipes, a quantity of residential fire sprinklers. The supply of pressurized fluid is located proximate the dwelling unit. The network of pipes is in fluid communication with the fluid supply, and the network of pipes includes at least one pipe extending over each of the compartments. The at least one pipe is filled generally with a gas so that the at least one pipe is dry. The quantity of residential fire sprinklers is located adjacent each of the compartments, and each of the quantity of residential fire sprinklers is coupled to the at least one pipe filled with a gas so that, upon actuation of at least one fire sprinkler of the quantity of residential fire sprinklers, fluid is delivered from fluid supply to the compartments within a first time period. And, the quantity of residential fire sprinkler is based on a calculated hydraulic demand for all residential fire sprinklers, up to two sprinklers, having the highest calculated demand within a compartment.

In yet a further aspect of the present invention, a fire protection system residential dwelling unit fire protection system is provided. The residential dwelling unit has a plurality of compartments as defined in the 2002 National Fire Protection Association Standards 13 and 13R. The system includes a supply of pressurized fluid, a network of pipes, a quantity of residential fire sprinklers. The system includes a supply of pressurized fluid, a network of pipes, a quantity of residential fire sprinklers. The supply of pressurized fluid is located proximate the dwelling unit. The network of pipes is in fluid communication with the fluid supply, and the network of pipes includes at least one pipe extending over each of the compartments. The at least one pipe is filled generally with a gas so that the at least one pipe is dry. The quantity of residential fire sprinklers is located adjacent each of the compartments, and each of the quantity of residential fire sprinklers is coupled to the at least one pipe filled with a gas so that, upon actuation of at least one fire sprinkler of the quantity of residential fire sprinklers, fluid is delivered from fluid supply to the compartments within a first time period. And, the quantity of residential fire sprinkler is based on a calculated hydraulic demand for all residential fire sprinklers, up to four sprinklers, having the highest calculated demand within a compartment.

In yet another aspect of the invention, a method of communicating fire protection information for a residential dwelling unit as defined in the 2002 National Fire Protection Association Standards 13, 13D, and 13R is provided. The method includes identifying residential fire protection information and directing a user to design a residential fire protection system with the information. The identification includes: at least one type of fire sprinkler for each of the plurality of protected areas including a rated K-factor for the fire sprinkler; a plurality of areas to be protected in the dwelling unit, each of the plurality of design protection areas having a dimension of X by Y, wherein X is any value from 10 feet to 20 feet and Y is any value from 10 feet to 24 feet; and a plurality of minimum flow rates and residual pressures for a respective plurality of areas. The information is applicable to both wet and dry pipe residential fire sprinkler networks so that a user is directed to a design a residential fire protection system with the same number of the at least one fire sprinkler in one of wet or dry pipe system in a dwelling unit based on the identification of fire protection information.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Figure 1A:
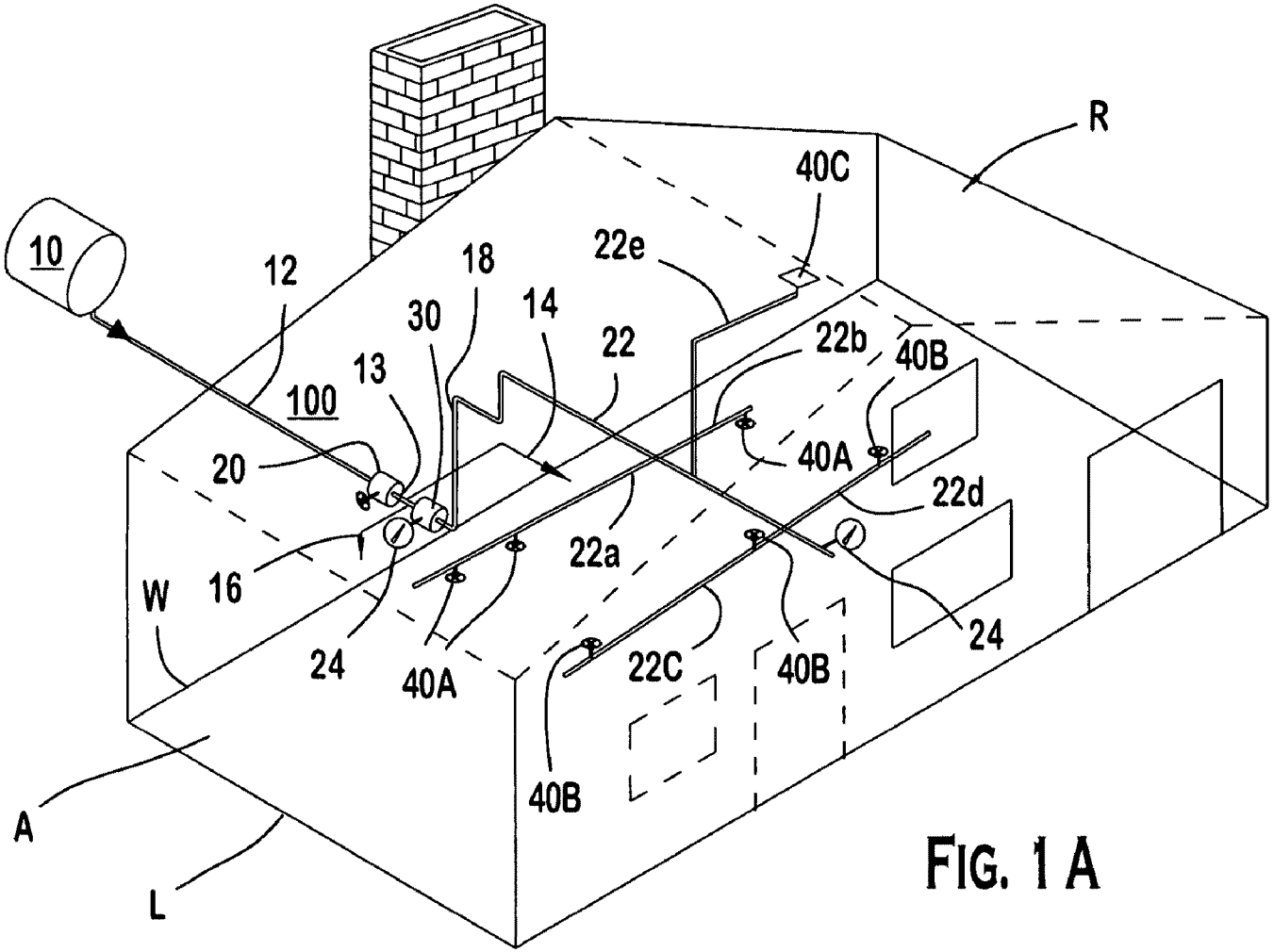
FIG. 1A is a perspective view of a residential sprinkler system with vertically-oriented and horizontally-oriented sprinklers according to a preferred embodiment.

FIGS. 1-2 illustrate the preferred embodiments. In particular FIG. 1A shows a residential dwelling unit R. As used herein, the term "residential" is a "dwelling unit" as defined in NFPA Standard 13D, 13R (2002), which can include commercial dwelling units (e.g., rental apartments, lodging and rooming houses, board and care facilities, hospitals, motels or hotels) to indicate one or more rooms, arranged for the use of individuals living together, as in a single housekeeping unit, that normally have cooking, living, sanitary, and sleeping facilities. The residential dwelling unit normally includes a plurality of compartments as defined in NFPA Standards 13, 13D, and 13R, where generally each compartment is a space that is enclosed by walls and ceiling. The standards relating to residential fire protection, including 2002 Standards 13, 13D, and 13R, as promulgated by the National Fire Protection Association ("NFPA Standard 13 (2002)", "NFPA Standard 13D (2002)", "NFPA Standard 13R (2002)") and Underwriter's Laboratory Residential fire sprinklers for Fire-Protection Service 1626 (October 2003) ("UL Standard 1626 (October 2003)"), are incorporated herein by reference in their entireties.

In the residential dwelling unit R of FIG. 1A, an exemplary dry fire protection system can be provided for a plurality of protection areas, including sub-divided protection areas, i.e., compartments to be protected within the residential unit R. For example, in protection area A with length L and width W, a dry fire protection system can include a supply 10 of pressurized fluid such as a suitable fluid supply 10, located proximate the dwelling unit R. A network of pipes 100 is coupled to the fluid supply 10 by preferably a single control valve 20 that can be used to shut off fluid to both a domestic water system for the occupants via pipe 14 and for the fire protection system via pipe 18 for the residential dwelling unit R. A back-flow check valve 13 can be provided upstream of the control valve 20 so as to prevent contamination of the water supply. The control valve 20 can be connected to a suitable dry pipe valve 30 (or other control valves) disposed between the control valve 20 and the piping network. A test and drain line 16 can be provided downstream of the control valve 20.

The fluid supply 10 can include a municipal water supply, an elevated fluid or pressurized-fluid tank, or a water storage with a water pump, which can provide a demand for a fire protection system for a suitable period, such as, for example, 10 to 30 minutes without any provisions that would prevent the use of domestic water flow by the occupants. Where a water system is designed to serve both the needs of the occupants of the dwelling unit and the fire protection system, the water system should: (1) account for water demand of more than five gallons per minute to multiple dwelling units when no provision is made to prevent the flow of the domestic water supply upon actuation of the residential fire sprinkler system; (2) include smoke or fire detector; (3) include listed or approved piping for the sprinkler system; (4) approved or permitted by local governmental authority; (5) include warning that a residential fire sprinkler system is connected to the domestic system; and (6) not add flow restriction device such as water filter to the system.

The network of pipes can include a riser 18 coupled to a main pipe 22. The main pipe 22 can be couple to a plurality of branch pipes 22a, 22b, 22c, 22d, 22e . . . 22n extending over each of the sub-divided areas. The main pipe 22 and branch pipes 22a, 22b, 22c . . . 22n can be filled generally with a suitable gas (e.g., air or nitrogen or mixtures thereof) so that the pipes are "dry." A pressure gauge 24 can be installed in the piping network 100 to provide an indication of the system pressure. The branch pipes 22a, 22b, 22c, 22d, 22e . . . 22n are coupled to a quantity of residential fire sprinklers 40A, 40B, 40C located adjacent each of the sub-divided areas.

Depending on the system design, the residential fire sprinklers can be vertically-oriented type fire residential fire sprinklers that are approved for dry residential applications. The vertically oriented type residential fire sprinklers can include, for example, pendent sprinkler 40A, upright sprinkler 40B, flush, or concealed pendent residential fire sprinklers. The residential fire sprinklers can be horizontally-oriented residential fire sprinklers that are approved for dry residential applications. The horizontally-oriented type residential fire sprinklers can include for example, sidewall sprinkler 40C, flush or concealed sidewall residential fire sprinklers.

Figure 1B:
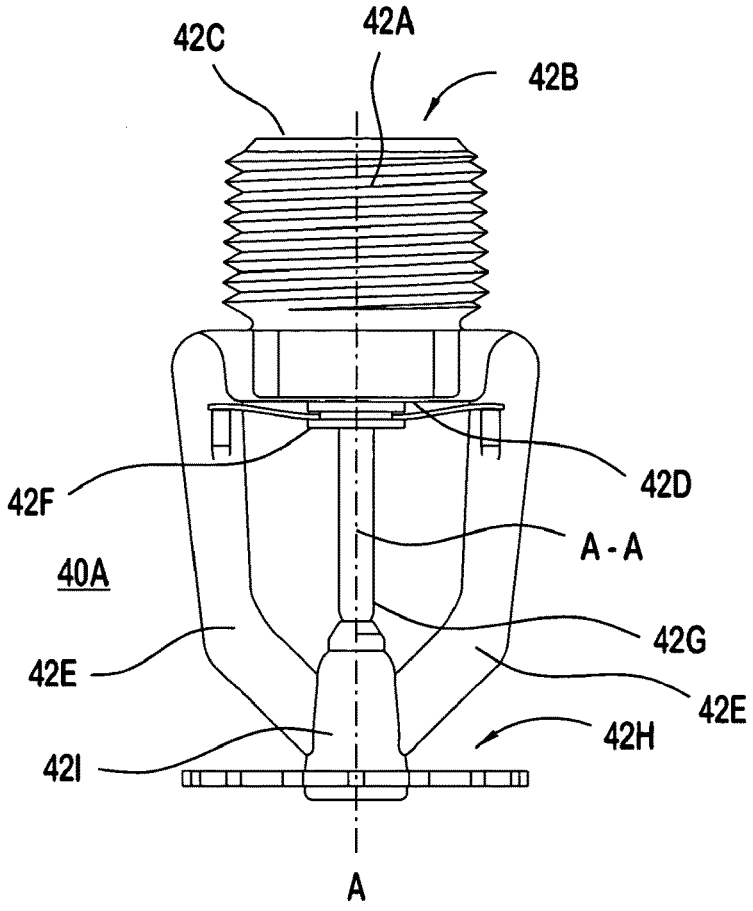
FIGS. 1B and 1C illustrate respectively a pendent and sidewall sprinklers of FIG. 1A.

Referring to FIG. 1B, the pendent type residential fire sprinkler 40A of the dry pipe network of FIG. 1A is shown in further detail. In particular, the sprinkler 40A includes a body 42A defining a passageway 42B between an inlet opening 42C and an outlet opening 42D along a longitudinal axis A-A oriented generally perpendicular to the protection area A. The body 42A is coupled to a dry pipe system so that the passageway 42B is filled with a dry gas or air. The passageway 42B has a rated K-factor, where the rated K-factor equals the flow of water in gallons per minute through the passageway divided by the square root of the pressure of water fed to the body in pounds per square inch gauge (GPM/(psig)$^{1/2}$). The rated K-factor can include, but is not limited to, any one of nominally 3.0, 3.9, 4.1, 4.2, 4.3, 4.4, 4.7, 4.9, 5.5, or 5.6 K-factor. The body 42A has at least one frame arm 42E coupled to the body 42A proximate the outlet opening 42D. A closure 42F can be positioned proximate the outlet opening 42D so as to occlude the passageway 42B. A heat responsive trigger 42G can be provided to retain the closure 42F so as to close the passageway. A deflector 42H can be coupled with the body through at least one frame arm 42E and nosepiece 42I so that the deflector 42H is spaced from and generally aligned with the outlet opening and the longitudinal axis A-A. The upright residential sprinkler 40B can include many similar components as the residential pendent sprinkler 40A and therefore has not been described to maintain brevity in this description. When the heat responsive trigger 42G is actuated, the closure 42F is positioned to allow the dry gas to be expelled from the dry pipes and the passageway 42B and for a flow of water to fill the previously-dry pipes and issue from the outlet opening 42D along axis A-A. The flow of water through the body 42A can include various flow rates, such as, for example, about 13, 16, 17, 19, 21, or 24 gallons per minute. The flow of water or a fire-fighting fluid through the dry pipe system is distributed over the protection area by the deflector so that the sprinkler by itself, or in conjunction with other sprinklers, protects the area of the residential dwelling unit.

Figure 1C:
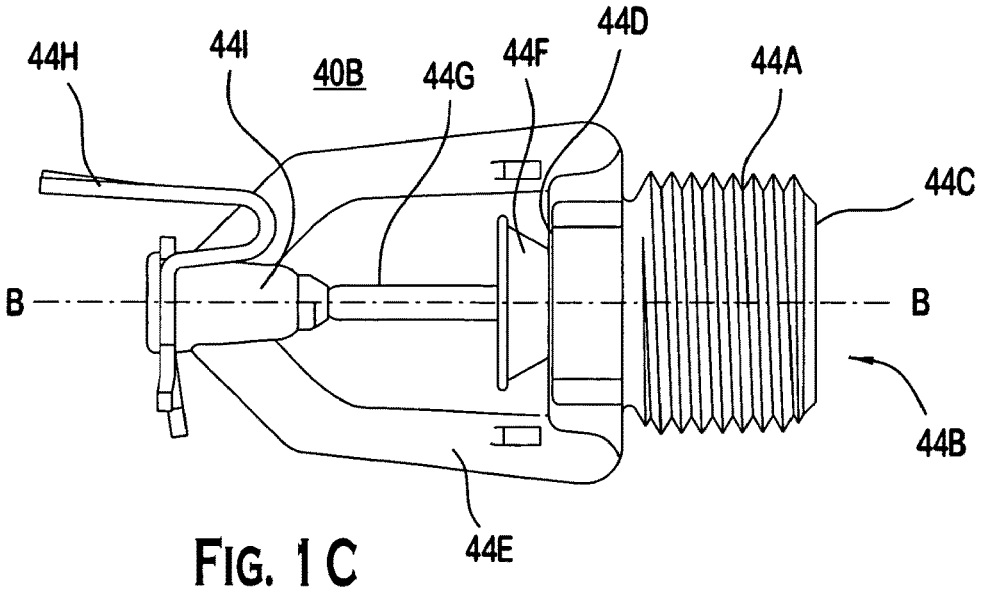

Referring to FIG. 1C, the sidewall residential sprinkler 40C of the dry pipe system of FIG. 1A is shown in further detail. In particular, the sprinkler 40C includes a body 44A defining a passageway 44B between an inlet opening 44C and an outlet opening 44D along a horizontal axis B-B oriented generally parallel to the protection area A. The passageway 44B has a rated K-factor, where the rated K-factor equals the flow of water in gallons per minute through the passageway divided by the square root of the pressure of water fed to the body in pounds per square inch gauge (GPM/(psig)$^{1/2}$). The rated K-factor can include, but is not limited to, any one of nominally 4 or 5 K-factor. The body 44A has at least one frame arm 44E coupled to the body 44A proximate the outlet opening 44D. A closure 44F can be positioned proximate the outlet opening 44D so as to occlude the passageway 44B. A heat responsive trigger 44G can be provided to retain the closure 44F so as to close the passageway. A deflector 44H can be coupled with the body through at least one frame arm 44E and nosepiece 44I so that the deflector 44H is spaced from and generally aligned with the outlet opening and the longitudinal axis A-A. When the heat responsive trigger 44G is actuated, the closure 44F is positioned to allow the dry gas to be expelled from the dry pipes and the passageway 44B and for a flow of water to fill the previously-dry pipes and issue from the outlet opening 44D along axis B-B. The flow of water through the body 44A can include various flow rates, such as, for example, about 12, 13, 14, 16, 17, 18, 19, 20, 21, 23, 24, 25, 26, 27, or 28 gallons per minute. The flow of water or a fire-fighting fluid through the dry pipe system is distributed over the protection area by the deflector so that the sprinkler by itself, or in conjunction with other sprinklers, protects the area of the residential dwelling unit. Thus, the means for distributing the fire-fighting fluid over a protection area of a residential dwelling unit can be any particular structures of the residential sidewall sprinkler 40B, which in the preferred embodiments include at least the deflector 44H.

Although no residential fire sprinklers have been approved for residential use with a piping network filled with a gas (i.e., "dry") instead of a network filled with fluid (i.e., "wet"), applicant has discovered that residential fire sprinklers, which were approved for use only in wet pipe residential fire protection system, would meet the approval requirements of NFPA Standard 13 (2002), 13D (2002) and 13R (2002) and UL Standard 1626 (October 2003). This discovery has allowed a residential fire sprinkler system with a dry pipe network to be designed by determining a minimum quantity and location of residential fire sprinklers required to determine a hydraulic demand calculation of the residential fire sprinklers. Applicant has discovered that, for certain applications in accordance with NFPA 13, 13D, and 13R, the minimum quantity and location of residential fire sprinklers in a piping network filled with a fire-fighting fluid can be used to determine a hydraulic demand of residential fire sprinklers coupled to a piping network filled with a gas.

In particular, referring to FIG. 1A, the quantity and location of residential fire sprinklers for a residential dwelling unit can be determined based on a hydraulic demand of the most hydraulically remote fire sprinkler within a compartment of the residential dwelling unit. Where the residential dwelling unit can be classified as a one or two-family dwelling unit, as defined in NFPA Standard 13D (2002), the hydraulic demand of a system for the dwelling unit can be determined by assessing a hydraulic demand of a residential fire sprinkler, up to two sprinklers, for a design area of each compartment while taking into account any obstructions on the walls or ceiling. Specifically, for each compartment, one or more residential fire sprinklers (as approved by an authority having jurisdiction over fire protection design to provide sufficient fluid density) can be selected. The selected residential fire sprinklers, i.e., design sprinkler, in the selected compartment can be used to determine if the design sprinklers, up to two sprinklers, located at specified locations within any one of selected compartments, have the highest hydraulic demand of a wet pipe fire protection system for the residential dwelling unit. For each compartment, the hydraulic demand is calculated based on the location of the design sprinklers from the fluid supply source to the wet pipe network for, in some cases, all of the compartments. From the calculated hydraulic demand of some or all the compartments, the highest hydraulic demand for a particular compartment of the residential dwelling unit can be determined. This highest hydraulic demand is then compared with an actual fluid flow rate and pressure of the fluid supply. Where the highest hydraulic demand can be met by the actual fluid supply for the residential dwelling unit, the number of fire sprinklers is the sum of all the design sprinklers within the residential dwelling unit in the design of a dry pipe residential fire protection system of the dwelling unit. Thereafter, the design can be implemented, at a minimum, in accordance with installation guidelines set forth in NFPA Standard 13D (2002).

Where the residential dwelling unit can be classified as a residential dwelling unit up to and including four stories in height, as defined in NFPA Standard 13R (2002), the hydraulic demand of a system for the dwelling unit can be determined by assessing a hydraulic demand of a residential fire sprinkler, up to two sprinklers, for a design area of each compartment while taking into account any obstructions on the walls or ceiling. Specifically, for each compartment, one or more residential fire sprinklers (as approved by an authority having jurisdiction over fire protection design to provide sufficient fluid density) can be selected. The selected residential fire sprinklers, i.e., design sprinkler, in the selected compartment can be used to determine if the design sprinklers, up to four sprinklers, located at specified locations within any one of selected compartments, have the highest hydraulic demand of the fire protection system for the residential dwelling unit. For each compartment, the hydraulic demand is calculated based on the location of the design sprinklers from the fluid supply source to the wet pipe network for, in some cases, all of the compartments. From the calculated hydraulic demand of some or all the compartments, the highest hydraulic demand for a particular compartment of the residential dwelling unit can be determined. This highest hydraulic demand is then compared with an actual fluid flow rate and pressure of the fluid supply. Where the highest hydraulic demand of the residential dwelling unit can be met by the actual fluid supply for the residential dwelling unit, the number of fire sprinklers is the sum of all the design sprinklers within the residential dwelling unit in the design of a dry pipe residential fire protection system of the dwelling unit. Thereafter, the design can be implemented in accordance, at a minimum, with installation guidelines set forth in NFPA Standard 13R (2002).

Applicant has verified that the hydraulic demand design criteria of a wet pipe residential fire sprinkler system are applicable to a dry pipe system by tests based on guidelines set forth by NFPA Standards 13, 13D, 13R (2002) and UL Standard 1626 (October 2003). Based on testing in accordance with these guidelines, it has been discovered that residential fire sprinklers can deliver the required density set forth by NFPA Standards 13, 13D, 13R (2002 Eds.) and UL Standard 1626 (October 2003) within the maximum water delivery time of 15 seconds to the Most-Hydraullically-Remote fire sprinkler, as set forth in NFPA Standard 13 (2002), Table 11.2.3.9.1, at the required density of 0.05 gpm/sq. ft. in a dry pipe system while meeting the testing requirements of UL Standard 1626 (October 2003).

In particular, each of the plurality of residential fire sprinklers includes a pendant type fire sprinkler having a rated K-factor of at least nominally 4, as shown and described in Tyco Fire Product Datasheet TFP400 Series II Residential Pendent Sprinklers 4.9 K-factor (April 2004) and identified by Sprinkler Identification Number TY2234, which datasheet is incorporated herein by reference in its entirety; a sidewall sprinkler having a rated K-factor of at least nominally 4, as shown and described in Tyco Fire Product Datasheet TFP410 Series II LFII Residential Horizontal Sidewall Sprinklers 4.2 K-factor (April 2004) and identified by Sprinkler Identification Number TY1334, which datasheet is incorporated herein by reference in its entirety; and a flush-pendent sprinkler having a rated K-factor of at least nominally 4, as shown and described in Tyco Fire Product Datasheet TFP410 Series II LFII Residential Flush Pendent Sprinklers 4.2 K-factor (April 2004), and identified by Sprinkler Identification Number TY2284, which datasheet is incorporated herein by reference in its entirety. And as used herein, the term "nominally" or "nominal" indicates ±10% in variations from the values indicated.

Applicant has verified his discovery of residential fire sprinklers for use in residential dry pipe system applications with tests that were previously used for wet systems. For example, the identified pendent sprinklers TY1334, TY2234, and TY2284 have complied with requirements for a wet system as set forth by NFPA Standards 13, 13D, 13R (2002 Eds.) and UL Standard 1626 (October 2003) for various ceiling configurations including flat, sloped and beamed ceilings. A brief description of the test procedures that were used to verify their discovery is provided below.

For test configurations to determine the horizontal water distribution of existing vertically oriented residential sprinkler (e.g., upright or pendent) and horizontally oriented residential fire sprinklers (e.g., sidewall), UL Standard 1626 (October 2003) requires placing a selected sprinkler over a protective area sub-divided into four quadrants with the sprinkler placed in the center of the quadrants. Water collection pans are placed over one quadrant of the protective area so that each square foot of the quadrant is covered by collector pan of one-square foot area. For vertically oriented type sprinklers, the top of the collector pan is 8 feet below a generally flat ceiling of the test area. For horizontally oriented type sprinkler, the top of each collection pan is about six feet ten inches below the ceiling. The area is generally the product of a coverage width and length. The length L of the quadrant is generally the one-half the coverage length and the width W is generally one-half the coverage width. Water is supplied to the selected sprinkler at the flow rate specified in the installation instruction provided with the sprinkler being tested via a one-inch internal diameter pipe with a T-fitting having an outlet at substantially the same internal diameter as the inlet of the selected sprinkler. The duration of the test is twenty-minutes and at the completion of the test, the water collected by the pan is measured to determine if the amount deposited complies with the minimum density requirement. Additional details of this test are shown and described in UL Standard 1626 (October 2003), which is incorporated herein by reference.

For test configurations to determine vertical water distribution of other existing vertically oriented residential sprinkler (e.g., upright or pendent) and horizontally oriented residential fire sprinklers (e.g., sidewall) UL Standard 1626 (October 2003) provides for two arrangements. In the first arrangement for vertically oriented sprinkler, the sprinkler is placed at one-half the coverage length or width. In the second arrangement for horizontally-oriented sprinkler, the sprinkler is placed below the generally flat ceiling but no lower than twenty-eight inches below the ceiling on one wall surface and at no greater than one-half the distance of an uninterrupted surface of a wall. Water is delivered to the sprinkler at the flow rate specified in the installation instruction provided with the sprinkler being tested via a one-inch internal diameter pipe. Water collection pans of one-square foot area are placed on the floor against the walls of the test area so that the top of the pan is six feet, ten inches below a nominally eight feet generally flat ceiling. The duration of the test is ten-minutes at which point the walls within the coverage area should be wetted to within 28 inches of the sprinkler at the specified design flow rate. Where the coverage area is square, each wall must be wetted with at least five percent of the sprinkler flow. Where the coverage area is rectangular, each wall must be wetted with a proportional water amount collected that is generally equal to 20 percent of times the length of the wall divided by the perimeter of coverage area.

Actual fire tests can also be performed in accordance with UL Standard 1626 (October 2003) for each type of residential fire sprinklers. In particular, three tests arrangement can be utilized within a room with nominally eight feet generally horizontal or flat ceiling and simulated furniture so that the tested residential sprinkler can limit temperatures at four different locations to specified temperatures. In all three test arrangements, a rectangular-shaped coverage area is provided with first and second parallel walls whose length are longer than third and fourth walls that extend orthogonally to each of the first and second walls. The third and fourth walls are each provided with an entrance; one entrance with 35 inches of width and the other entrance with 41 inches of width.

Two sprinklers to be tested are spaced apart over a first distance to provide fluid distribution over the protected area. A third sprinkler to be tested is disposed proximate the larger width opening. Simulated furnitures are oriented in an orthogonal configuration to generally surround a wood crib and one corner of the protected area distal to the smaller opening. A first thermocouple is located 0.25 inches above the ceiling and 10 inches diagonally from the one corner. A second thermocouple is located in the geometric center of the room and three inches below the ceiling. Additional details of the test room, fire source burning characteristics, sprinkler installation and exact parameters for carrying out the fire tests are provided in UL Standard 1626 (October 2003).

In the first fire testing arrangement for vertically-oriented sprinklers (e.g., pendent, upright, flush, recessed pendent and concealed), a third thermocouple can be located three inches below the ceiling and eight inches from a first sprinkler located nearest the simulated furniture. The first sprinkler is located at a distance L from a second sprinkler so that the first sprinkler is located at one-half L from the third wall with the smaller opening. A third sprinkler is located three feet from the second wall and four inches from the larger opening.

In the second fire testing arrangement for horizontally-oriented sprinklers, first and second sprinklers are mounted in the wall distal to the simulated furniture and spaced apart over a distance W so that the first sprinkler is nearest the smaller opening and located at a distance of one-half W to the third wall having the smaller opening. The second sprinkler is about nominally eight feet from a third sprinkler mounted on the wall. A third thermocouple is located directly across from the first sprinkler at a distance of one-half the width of the room, at three inches below the ceiling and 5 feet and one-quarter inches above the floor.

In the third fire testing arrangement for horizontally-oriented sprinklers, the first and second sprinklers are mounted in the wall proximal to the simulated furniture and spaced apart over a distance W along the wall. A third thermocouple is located in the same location as in the second testing arrangement.

In all three fire-testing arrangements, when the fire sources are ignited in accordance with UL Standard 1626 (October 2003), the residential fire sprinklers provide a predetermined water flow rate within fifteen seconds of actuation of at least one sprinkler over the coverage area to limit the maximum temperature measured by the second and third thermocouples cannot exceed 600 degrees Fahrenheit ("degrees F."). To comply with UL Standard 1626 (October 2003), the maximum temperature measured by the third thermocouple cannot exceed 200 degrees F. and cannot exceed more than 130 degrees F. for any continuous duration of more than two minutes. To comply with UL Standard 1626 (October 2003), the maximum temperature measured by the first thermocouple cannot exceed 500 degrees F.

As can be seen above, it has been discovered that the design criteria in the dry residential system for the protection area A of FIG. 1A is the same design criteria for residential fire sprinklers in a wet residential system for the protection area A of the residential unit R of FIG. 1A. Such discovery is believed to be heretofore unknown and unexpected in the fire protection art. This discovery has allowed an implementation of a method not previously available in the art. This method provides for at least the design, classification, approval, and implementation of dry sprinkler and dry sprinkler system in residential dwelling unit, which residential sprinkler and dry sprinkler system are believed to provide the same or similar protection of a wet fire protection system without the difficulties that may be encountered with a wet system, e.g., leakage or unexpected expulsion of water from the sprinklers.

Moreover, by virtue of applicant's discovery, individuals associated with residential fire protection are now able to specify a design protection area and determine at least the following design parameters for the specified design protection area: (1) which specific sprinklers are suitable for use with the same number of sprinklers for wet or dry residential fire sprinklers; (2) the types of ceiling consonant with the specified sprinkler; (3) the specified coverage areas for each type of ceiling over a protection area; (4) the flow rate and residual pressure for each specified coverage area in each type of ceiling over a protection area; for each of wet or dry pipe systems. And these individuals are now able to obtain the parameters identified above in a suitable communication medium that would facilitate the design process for these individuals. For example, as shown in FIGS. 2A and 2B, the communication media can be a computer with a graphical user interface.

Figure 2A:
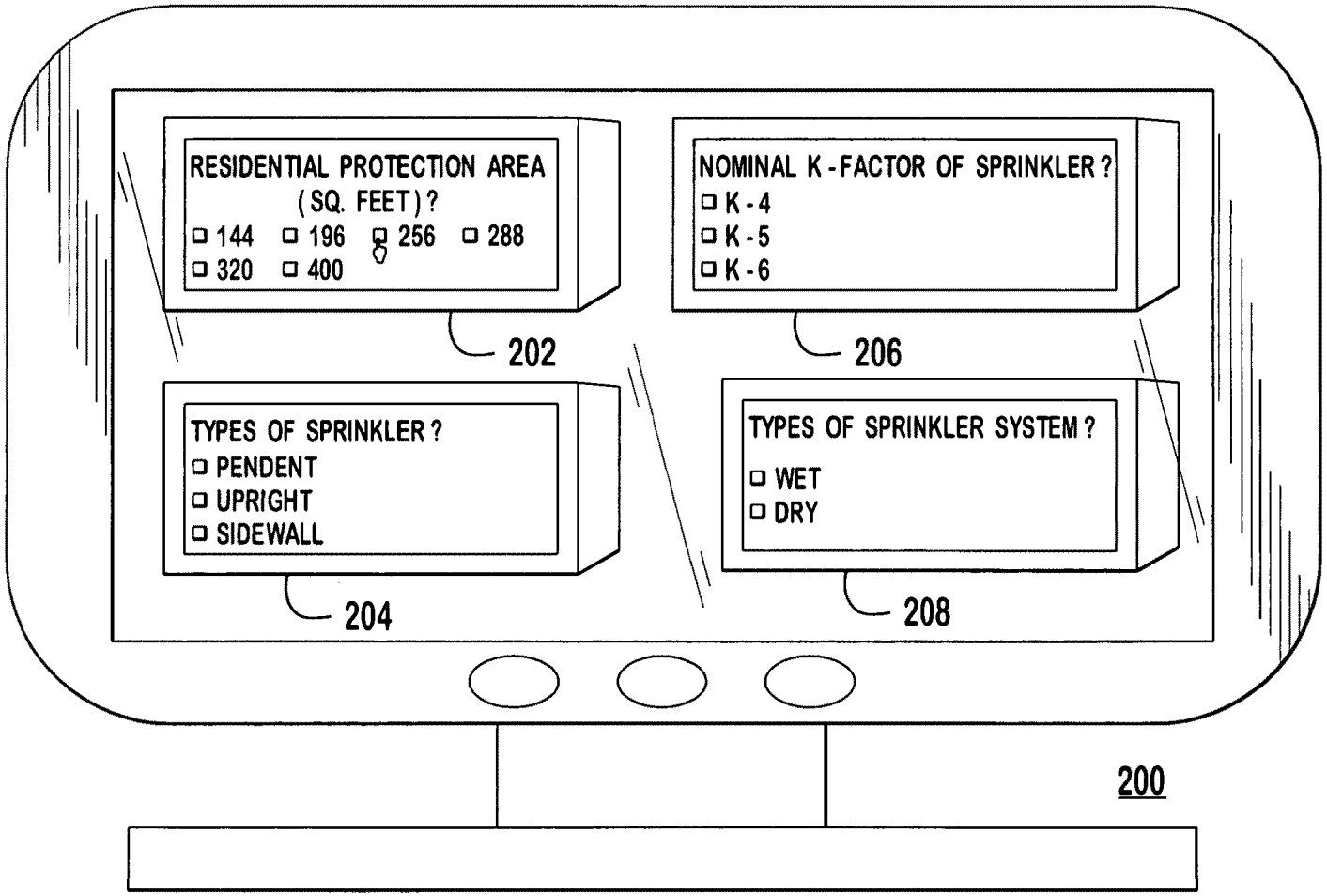
FIGS. 2A and 2B illustrate a preferred communication medium for the preferred wet or dry sprinkler design methodology.
Figure 2B:
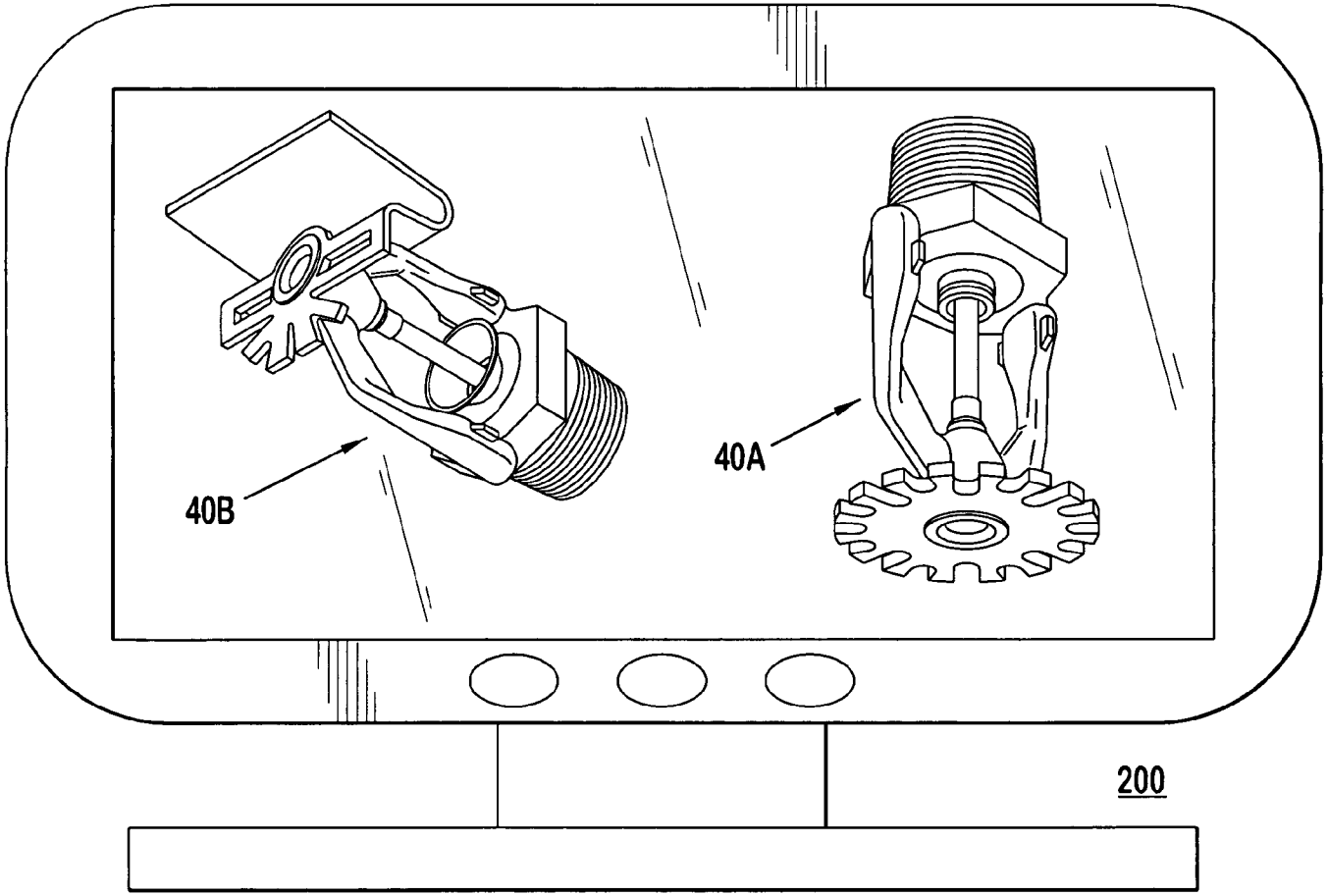

Referring to FIGS. 2A and 2B, a user can load a program into a communication medium (e.g., a computer 200) that embodies appropriate computational engines such as, for example, the determination of the, and a database of operational characteristics of residential fire sprinklers. The computer 200 would receive appropriate operational parameters of an area to be protected for a residential application and would provide appropriate selections (via dialogs 202, 204, 206, 208 or a menu) of residential fire sprinklers suitable for at least a dry pipe system of such residential application. By way of example, the user can select from a menu or provide arbitrary values of an actual protection area and various parameters of such area (e.g., obstructions or ceiling offset) in a dialog type entry; select the type of sprinkler (e.g., upright, pendent, sidewall, or flush pendent, flush sidewall); select the appropriate nominal rated K-factor; and select either or both wet and dry pipe systems. Once the appropriate parameters have been entered into the computer, the computational engines programmed into the computer are then used to provide the user with a choice of residential fire sprinklers appropriate for such design, such as, for example, the identification of appropriate sprinklers, the number of sprinklers necessary for both wet or dry pipe system.

The user can obtain graphical tabulations of design parameters for both wet and dry pipe residential systems in a different communication medium. In a paper medium, the design parameters can be tabulated as appropriate for the type of design protection area based on any suitable lead criterion. The lead criterion is chosen to be the type of ceiling. Based on this lead criterion, the design parameters are then provided to the user in the form of maximum coverage area; maximum spacing between sprinklers; spacing between deflector of sprinkler to ceiling; and flow rate with residual pressure required for these design parameters. As another example, the lead criterion can be the type of sprinkler (e.g., upright, pendent, sidewall) so that the appropriate tabulation of design parameters consonant with the lead criterion can be provided. Hence, the lead criterion can be selected from any of the design parameters and the appropriate design parameters consonant with the lead criterion can be tabulated and provided in a suitable communication medium. Although one electronic communication medium has been described, other communication medium are also suitable, such as, for example, a voice prompt wireless communication medium (e.g., cellular telephone)

or voice prompt toll-free wire communication (e.g., land line telephone). Alternatively, the communication medium could be paper.

Regardless of the particularity of the communication medium, the medium would preferably include an identification of fire protection information, such as, for example, (1) at least one type of fire sprinkler for each of the plurality of protected areas; (2) a plurality of areas to be protected in the dwelling unit, each of the plurality of design protection areas having a dimension of X by Y, wherein X is any value from 10 feet to 20 feet and Y is any value from 10 feet to 24 feet; and (3) a plurality of minimum flow rates and residual pressures for a respective plurality of areas. The communication medium would also include a description of wet and dry pipe residential fire sprinkler networks that directs a user to design a residential fire protection system with the same number of the at least one residential fire sprinkler in one of wet or dry pipe system in a dwelling unit based on the identification of fire protection information such as, for example, a calculation to determine the quantity of residential fire sprinklers.

The identification of fire protection information can also include information of protection areas in relation to at least one of the following: (a) type of ceiling over the design protection area such as, for example, generally flat, sloped, or beamed ceiling; (b) spacing between any two of the at least one type of residential fire sprinklers; (c) rated K-factor of the at least one type of fire sprinkler such as a nominal rated K-factor of 4 or 5; (d) minimum flow rate per sprinkler such as, for example, a plurality of flow rates for a pendent type residential sprinkler with a rated K-factor of 4.9 when connected to at least one dry pipe of the network of pipes in one of the plurality of design protection areas having a variety of ceiling configurations.

As installed, suitable residential fire sprinklers described and shown herein can be coupled to a dry piping network, which are supplied with a fire-fighting fluid, e.g., a water supply, after the sprinkler is activated. Preferred embodiments include residential fire sprinklers that are suitable for use such as, for example, with a dry pipe system (e.g. that is the entire system is exposed to freezing temperatures in an unheated portion of a building) or a wet pipe system (e.g. the sprinkler extends into an unheated portion of a building).

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

~~1. A method of designing a dry pipe residential fire protection system using hydraulic demand criteria of a wet pipe residential fire sprinkler system based on one or more fire protection standards, the dry system being for a residential dwelling unit having a fluid supply source defined by a flow and pressure and a plurality of compartments as defined in one or more of the fire protection standards, the fire protection standards being: 2002 National Fire Protection Association Standards 13, 13D, and 13R, the method comprising:~~

~~determining a minimum quantity and location of residential fire sprinklers meeting the approval requirements of at least one of the fire protection standards including UL 1626 (October 2003), so as to be approved for use in wet pipe residential fire protection systems for a piping network filled with water in a wet pipe fire sprinkler system arranged to protect the plurality of compartments as defined in one or more of the fire protection standards, the fire protection standards being: 2002 National Fire Protection Association Standards 13, 3D, and 13R, the determining of the minimum quantity and location of the residential sprinklers being based upon hydraulic demand design criteria for the wet system designed under guidelines set forth by the applicable fire protection standards for the unit, such that the determining the minimum quantity includes:~~

~~determining a wet design area;~~

~~determining a number of sprinklers for the wet system so as to comply with a sprinkler coverage requirement for each compartment;~~

~~determining a hydraulic demand for each compartment in the wet system including determining the highest hydraulic demand of the wet system;~~

~~determining that the flow and pressure of the fluid supply source satisfies the highest hydraulic demand of the wet system; and~~

~~specifying the minimum quantity and location of residential fire sprinklers, as determined, for the dry system having a dry design area that is the same as the wet design area, wherein~~

~~the residential sprinklers being a type of at least one of vertically oriented and horizontally oriented satisfying actual fire tests in accordance with UL 1626 (October 2003), the actual fire test being performed in accordance with UL Standard 1626 (October 2003) for each type of residential fire sprinkler including three tests each being performed in an arrangement including:~~

~~a room with nominally eight feet generally horizontal or flat ceiling and simulated furniture, the arrangement defining a rectangular-shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture is oriented in an orthogonal configuration so as to generally surround a wood crib, one corner of the coverage area being distal to the first opening;~~

~~a first thermocouple being located 0.25 inches above the ceiling and 10 inches diagonally from the one corner;~~

~~a second thermocouple being located in the geometric center of the room and three inches below the ceiling;~~

~~a first of the fire testing arrangements being for a vertically oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one-half L from the third wall with the first opening, a third sprinkler in the first testing arrangement being~~

~~located three feet from the second wall and four inches from the second opening;~~

~~a second of the fire testing arrangements being for horizontally oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one-half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one-half the width of the room, at three inches below the ceiling and 5 feet and one-quarter inches above the floor; and~~

~~a third of the fire testing arrangements being for horizontally oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one-half the width of the room, at three inches below the ceiling and 5 feet and one-quarter inches above the floor, wherein~~

~~when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F.), the maximum temperature measured by the third thermocouple to be less than or equal to 200 degrees F. and less than or equal to 130 degrees F. for any continuous duration of more than two minutes, the maximum temperature measured by the first thermocouple being less than or equal to 500 degrees F.~~

~~2. The method of claim 1, wherein the determining includes selecting the residential sprinklers at a rated K-factor appropriate for the pressure and flow rate of the fluid supply source.~~

~~3. The method of claim 2, wherein specifying comprises calculating the hydraulic flow rate of the selected residential fire sprinkler from the fluid supply source to the selected residential fire sprinkler to determine whether the selected fire sprinkler, up to a maximum of two, within a compartment of the residential dwelling unit, requires the highest hydraulic flow rate.~~

~~4. The method of claim 2, wherein specifying comprises calculating the hydraulic flow rate of the selected residential fire sprinkler from the fluid supply source to the selected residential fire sprinkler to determine whether the selected fire sprinkler, up to a maximum of four, within a compartment of the residential dwelling unit, requires the highest hydraulic flow rate.~~

~~5. The method of one of claims 3 and 4, wherein the specifying comprises selecting residential fire sprinklers at a nominal rated K-factor selected from a group of rated K-factors consisting of 3.0, 3.9, 4.1, 4.2, 4.3, 4.4, 4.7, 4.9, 5.5, and 5.6.~~

~~6. The method of claim 5, wherein calculating the hydraulic flow rate provides a flow of water in gallons per minute selected from a group of flow rates consisting of 12, 13, 14, 16, 17, 18, 19, 20, 21, 23, 24, 25, 26, 27, and 28 gallons per minute.~~

~~7. A method of designing a dry pipe residential fire protection system using the hydraulic demand criteria of a wet pipe residential fire sprinkler system based on one or more fire protection standards, the standards being: 2002 National Fire Protection Association Standards 13, 13D, and 3R, the system being for a residential dwelling unit having a plurality of compartments as defined in the 2002 National Fire Protection Association Standards 13D, the method comprising:~~

~~determining a wet design area of the wet system and a minimum number of residential fire sprinklers meeting the approval requirements of at least one or more of the fire protection standards including UL Standard 1626 (October 2003) so as to be approved for use in wet pipe residential fire protection systems based on a hydraulic demand calculation of the wet pipe fire sprinkler system, the hydraulic demand calculation being a function of up to two sprinklers located within at least one of the plurality of compartments of the residential dwelling unit, as defined in the 2002 National Fire Protection Association Standards 13D, the hydraulic demand calculation of the wet pipe fire sprinkler system being based upon hydraulic demand design criteria for a wet system designed under guidelines set forth by 2002 National Fire Protection Association Standards 13D, wherein determining the minimum quantity of residential fire sprinklers based upon the hydraulic demand calculation of the wet system includes;~~

~~determining a number of sprinklers for the wet system so as to comply with the preselected density;~~

~~determining a hydraulic demand for each compartment in the wet system including determining the highest hydraulic demand of the wet system;~~

~~determining that the flow rate of the liquid supply source satisfies the highest hydraulic demand of the wet system, and wherein; and~~

~~specifying the minimum quantity and location of residential fire sprinklers, as determined, in the dry system, the dry system having a dry design area the same as the wet design area for the wet system, the dry system including:~~

~~(a) a water supply source to provide sufficient water flow rate to a network of pipes so as to maintain a preselected density under NFPA 13D for a predetermined duration;~~

~~(b) a single control valve;~~

~~(c) a dry pipe valve; and~~

~~(d) a network of pipes to be filled with a gas when the residential sprinklers are in an unactuated condition so that the pipes are dry;~~

~~the residential sprinklers being a type of at least one of vertically oriented and horizontally oriented satisfying actual fire tests in accordance with UL 1626 (October 2003), the actual fire test being performed in accordance with UL Standard 1626 (October 2003) for each type of residential fire sprinkler including three tests each being performed in an arrangement including:~~

~~a room with nominally eight feet generally horizontal or flat ceiling and simulated furniture, the arrange-~~

~~ment defining a rectangular shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture is oriented in an orthogonal configuration so as to generally surround a wood crib, one corner of the coverage area being distal to the first opening;~~

~~a first thermocouple being located 0.25 inches above the ceiling and 10 inches diagonally from the one corner;~~

~~a second thermocouple being located in the geometric center of the room and three inches below the ceiling;~~

~~a first of the fire testing arrangements being for a vertically oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one half L from the third wall with the first opening, a third sprinkler in the first testing arrangement being located three feet from the second wall and four inches from the second opening;~~

~~a second of the fire testing arrangements being for horizontally oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one half the width of the room, at three inches below the ceiling and 5 feet and one quarter inches above the floor; and~~

~~a third of the fire testing arrangements being for horizontally oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one half the width of the room, at three inches below the ceiling and 5 feet and one quarter inches above the floor, wherein~~

~~when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F.), the maximum temperature measured by the third thermocouple to be less than or equal to 200 degrees F. and less than or equal to 130 degrees F. for any continuous duration of more than two minutes, the maximum temperature measured by the first thermocouple being less than or equal to 500 degrees F.~~

~~8. A method of designing a dry pipe residential fire protection system using the hydraulic demand criteria of a wet pipe residential fire sprinkler system based on one or more fire protection standards, the standards being: 2002 National Fire Protection Association Standards 13, 13D, and 3R, the system being for a residential dwelling unit having a plurality of compartments as defined in the 2002 National Fire Protection Association Standards 13 and 13R, the method comprising:~~

~~determining a wet design area of the wet system and a minimum number of residential fire sprinklers meeting the approval requirements of at least one or more of the fire protection standards including UL Standard 1626 (October 2003) so as to be approved for use in wet pipe residential fire protection systems based on a hydraulic demand calculation of a wet pipe fire sprinkler system, the hydraulic demand calculation being a function of up to four sprinklers located within at least one of the plurality of compartments of the residential dwelling unit, as defined in the 2002 National Fire Protection Association Standards 13 and 13R, the hydraulic demand calculation of the wet pipe fire sprinkler system being based upon hydraulic demand design criteria for a wet system designed under guidelines set forth by 2002 National Fire Protection Association Standards 13 and 13R, wherein determining the minimum quantity of residential fire sprinklers based upon the hydraulic demand calculation of the wet system includes:~~

~~determining a number of sprinklers for the wet system so as to comply with the preselected density;~~

~~determining a hydraulic demand for each compartment in the wet system including determining the highest hydraulic demand of the wet system;~~

~~determining that the flow rate of the liquid supply source satisfies the highest hydraulic demand of the wet system, and wherein; and~~

~~specifying the minimum quantity and location of residential fire sprinklers, as determined, in the dry system, the dry system having a dry design area the same as the wet design area for the wet system, the dry system including:~~

~~(a) a water supply source to provide sufficient water flow rate to a network of pipes so as to maintain a preselected density under NFPA 13 and 13R for a predetermined duration;~~

~~(b) a single control valve;~~

~~(c) a dry pipe valve; and~~

~~(d) a network of pipes to be filled with a gas when the residential sprinklers are in an unactuated condition so that the pipes are dry, the residential sprinklers being a type of at least one of vertically oriented and horizontally oriented satisfying actual fire tests in accordance with UL 1626 (October 2003), the actual fire test being performed in accordance with UL Standard 1626 (October 2003) for each type of residential fire sprinkler including three tests each being performed in an arrangement including:~~

~~a room with nominally eight feet generally horizontal or flat ceiling and simulated furniture, the arrange-~~

~~ment defining a rectangular shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture is oriented in an orthogonal configuration so as to generally surround a wood crib, one corner of the coverage area being distal to the first opening;~~

~~a first thermocouple being located 0.25 inches above the ceiling and 10 inches diagonally from the one corner;~~

~~a second thermocouple being located in the geometric center of the room and three inches below the ceiling;~~

~~a first of the fire testing arrangements being for a vertically oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one half L from the third wall with the first opening, a third sprinkler in the first testing arrangement being located three feet from the second wall and four inches from the second opening;~~

~~a second of the fire testing arrangements being for horizontally oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one half the width of the room, at three inches below the ceiling and 5 feet and one quarter inches above the floor; and~~

~~a third of the fire testing arrangements being for horizontally oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one half the width of the room, at three inches below the ceiling and 5 feet and one quarter inches above the floor, wherein~~

~~when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F.), the maximum temperature measured by the third thermocouple to be less than or equal to 200 degrees F. and less than or equal to 130 degrees F. for any continuous duration of more than two minutes, the maximum temperature measured by the first thermocouple being less than or equal to 500 degrees F.~~

~~9. The method of one of claims 1, 7 and 8, wherein the specifying comprises identifying:~~

~~at least one type of residential fire sprinkler to be used in the dwelling unit;~~

~~a plurality of protection areas to be protected by the at least one type of residential fire sprinkler in the dwelling unit, each of the plurality of protection areas having a dimension of X by Y, wherein X is any value from 10 feet to 20 feet and Y is any value from 10 feet to 24 feet; and~~

~~a plurality of minimum flow rates and residual pressures for a respective one of a plurality of protection areas.~~

~~10. The method of claim 9, wherein identifying the plurality of protection areas includes relating the plurality of protection areas to at least one of the following:~~

~~(a) spacing between any two of the at least one type of residential fire sprinklers;~~

~~(b) a type of ceiling over a protection area;~~

~~(c) rated K-factor of the at least one type of residential fire sprinkler;~~

~~(d) minimum flow rate per sprinkler;~~

~~(e) pressure of fluid being supplied to the at least one type of residential fire sprinkler; and~~

~~(f) temperature at which the at least one type of residential fire sprinkler activates.~~

~~11. The method of claim 10, wherein identifying the plurality of protection areas comprises identifying a protection area for at least one of a generally flat, sloped or beamed ceiling, and the protection area includes at least one of 144 square feet; 196 square feet; 256 square feet; 288 square feet; 320 square feet; or 400 square feet.~~

~~12. The method of claim 11, wherein relating the rated K-factor comprises relating a plurality of rated K-factors including nominal K-factors of 4 and 5.~~

~~13. The method of claim 12, wherein relating the at least one type of residential fire sprinklers comprises relating a fire sprinkler selected from a group consisting of one of a pendant sprinkler having a rated K-factor of 5, a sidewall sprinkler having a rated K-factor of 4, and combinations thereof.~~

~~14. The method of claim 13, wherein relating the minimum flow rate comprises relating a plurality of flow rates for a pendent type sprinkler with a rated K-factor of 4.9 when connected to at least one dry pipe of the network of pipes in one of the plurality of design protection areas having a horizontal ceiling with a maximum rise of two inches per foot of run, the plurality of flow rates including about 15 gallons per minute for a protected area of about 144, 196, or 256 square feet; about 17 gallons per minute for a protected area of about 324 square feet; or about 20 gallons per minute for a protected area of about 400 square feet.~~

~~15. The method of claim 14, wherein relating the minimum flow rate comprises relating a plurality of flow rates for a sidewall type sprinkler with a rated K-factor of 4.2 when connected to at least one dry pipe of the network of pipes in one of the plurality of protected areas, the plurality of flow rates including about at least 12 gallons per minute for a protected area of about 144 square feet; about at least 16 gallons per minute for a protected area of about 196 or 256~~

~~square feet; about at least 19 gallons per minute for a protected area of about 288 square feet; or about at least 23 gallons per minute for a protected area of about 320 square feet.~~

~~16. The method of claim 13, wherein relating the minimum flow rate comprises relating a plurality of flow rates for a pendent type sprinkler with a rated K-factor of 4.2 when connected to at least one dry pipe of the network of pipes in one of the plurality of design protection areas having a horizontal ceiling with a maximum rise of two inches per foot of run, the plurality of flow rates including about 13 gallons per minute for a protected area of about 144, 196, or 256 square feet; about 18 gallons per minute for a protected area of about 324 square feet; or about 22 gallons per minute for a protected area of about 400 square feet.~~

~~17. The method of claim 13, wherein relating the minimum flow rate comprises relating a plurality of flow rates for a pendent type sprinkler with a rated K-factor of 4.2 when connected to at least one dry pipe of the network of pipes in one of the plurality of design protection areas having a sloped ceiling with a maximum rise of eight inches per foot of run, the plurality of flow rates including about 17 gallons per minute for a protected area of about 144, 196, or 256 square feet; about 19 gallons per minute for a protected area of about 324 square feet; or about 24 gallons per minute for a protected area of about 400 square feet.~~

~~18. The method of claim 13, wherein relating the minimum flow rate comprises relating a plurality of flow rates for two pendent type sprinklers each with a rated K-factor of 4.2 when connected to respective dry pipes of the network of pipes in one of the plurality of design protection areas having a sloped ceiling with a maximum rise of eight inches per foot of run, the plurality of flow rates including about 14 gallons per minute for a protected area of about 144, 196, or 256 square feet; or about 18 gallons per minute for a protected area of about 324 square feet.~~

~~19. The method of claim 18, wherein the specifying comprises providing a density of at least 0.1 gallons per minute per square feet.~~

~~20. The method of claim 18, wherein the specifying comprises providing a density of at least 0.05 gallons per minute per square feet to each of the minimum quantity of residential fire sprinklers.~~

~~21. A method comprising:~~

~~identifying of fire protection information for a residential dwelling unit as defined in the 2002 National Fire Protection Association Standards 13, 13D, and 13R, the fire protection information including:~~

~~at least one type of residential fire sprinkler for each of the plurality of protected areas including a rated K-factor for the fire sprinkler, the residential sprinkler being a type of at least one of vertically oriented and horizontally oriented satisfying actual fire tests in accordance with UL 1626 (October 2003), the actual fire test being performed in accordance with UL Standard 1626 (October 2003) for each type of residential fire sprinkler including three tests each being performed in an arrangement including:~~

~~a room with nominally eight feet generally horizontal or flat ceiling and simulated furniture, the arrangement defining a rectangular shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture is oriented in an orthogonal configuration so as to generally surround a wood crib, one corner of the coverage area being distal to the first opening;~~

~~a first thermocouple being located 0.25 inches above the ceiling and 10 inches diagonally from the one corner;~~

~~a second thermocouple being located in the geometric center of the room and three inches below the ceiling;~~

~~a first of the fire testing arrangements being for a vertically oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one half L from the third wall with the first opening, a third sprinkler in the first testing arrangement being located three feet from the second wall and four inches from the second opening;~~

~~a second of the fire testing arrangements being for horizontally oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one half the width of the room, at three inches below the ceiling and 5 feet and one quarter inches above the floor; and~~

~~a third of the fire testing arrangements being for horizontally oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one half the width of the room, at three inches below the ceiling and 5 feet and one quarter inches above the floor, wherein~~

~~when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F.), the maximum temperature measured by the third thermocouple to be less than or equal to 200 degrees F. and less than or equal to 130 degrees F. for any continuous duration of more than two minutes, the maximum temperature measured by the first thermocouple being less than or equal to 500 degrees F.;~~

~~a plurality of areas to be protected in the dwelling unit, each of the plurality of design protection areas having a dimension of X by Y, wherein X is any value from 10 feet to 20 feet and Y is any value from 10 feet to 24 feet; and~~

~~a plurality of minimum flow rates and residual pressures to identify a hydraulic demand, for a wet pipe system based upon hydraulic demand design criteria including a wet design area for the wet system designed under guidelines set forth by at least one of 2002 National Fire Protection Association Standards 13, 13D and 13R so as to define a hydraulic demand for a dry pipe system configured to protect the plurality of areas, the hydraulic demand of the dry system being the same as hydraulic demand of the wet pipe system; and~~

~~directing a user to design a dry pipe residential fire protection system having a dry design area based on the fire protection information such that the dry design area of the dry pipe system is the same as the wet design area of the wet pipe system.~~

~~22. The method of claim 21, wherein identifying the fire protection information comprises specifying at least one of the following:~~

~~(a) type of ceiling over each of the design protection area;~~

~~(b) spacing between any two of the at least one type of residential fire sprinklers;~~

~~(c) rated K-factor of the at least one type of residential fire sprinkler from nominally 4 to 6;~~

~~(d) minimum flow rate per sprinkler;~~

~~(e) pressure of fluid being supplied to the at least one type of residential fire sprinkler; and~~

~~(f) temperature at which the at least one type of residential fire sprinkler activates.~~

~~23. The method of claim 22, wherein specifying the type of ceiling includes specifying at least one of a generally flat, sloped or beamed ceiling, and the identifying the fire protection information further includes specifying a protection area measurement as including at least one of 144 square feet; 196 square feet; 256 square feet; 288 square feet; 320 square feet; or 400 square feet.~~

~~24. The method of claim 23, wherein specifying the rated K-factor comprises specifying a plurality of rated K-factors including nominally 4 and 5.~~

~~25. The method of claim 23, wherein identifying the fire protection information includes identifying the at least one type of residential fire sprinklers as comprising a fire sprinkler selected from a group consisting of one of residential pendant sprinkler having a rated K-factor of 5, sidewall sprinkler having a rated K-factor of 4, and combinations thereof.~~

~~26. The method of claim 25, wherein identifying the fire protection information includes identifying the minimum flow rate comprises a plurality of flow rates for a residential pendent type sprinkler with a rated K-factor of 4.9 when connected to at least one dry pipe of the network of pipes in one of the plurality of design protection areas having a horizontal ceiling with a maximum rise of two inches per foot of run, the plurality of flow rates including about 15 gallons per minute for a protected area of about 144, 196, or 256 square feet; about 17 gallons per minute for a protected area of about 324 square feet; or about 20 gallons per minute for a protected area of about 400 square feet.~~

~~27. The method of claim 25, wherein identifying the fire protection information includes identifying the minimum flow rate comprises a plurality of flow rates for a residential sidewall type sprinkler with a rated K-factor of 4.2 when connected to at least one dry pipe of the network of pipes in one of the plurality of protected areas, the plurality of flow rates including about at least 12 gallons per minute for a protected area of about 144 square feet; about at least 16 gallons per minute for a protected area of about 196 or 256 square feet; about at least 19 gallons per minute for a protected area of about 288 square feet; or about at least 23 gallons per minute for a protected area of about 320 square feet.~~

~~28. The method of claim 25, wherein identifying the fire protection information includes identifying the minimum flow rate comprises a plurality of flow rates for a residential pendent type sprinkler with a rated K-factor of 4.2 when connected to at least one dry pipe of the network of pipes in one of the plurality of design protection areas having a horizontal ceiling with a maximum rise of two inches per foot of run, the plurality of flow rates including about 13 gallons per minute for a protected area of about 144, 196, or 256 square feet; about 18 gallons per minute for a protected area of about 324 square feet; or about 22 gallons per minute for a protected area of about 400 square feet.~~

~~29. The method of claim 25, wherein identifying the fire protection information includes identifying the minimum flow rate comprises a plurality of flow rates for a residential pendent type sprinkler with a rated K-factor of 4.2 when connected to at least one dry pipe of the network of pipes in one of the plurality of design protection areas having a sloped ceiling with a maximum rise of eight inches per foot of run, the plurality of flow rates including about 17 gallons per minute for a protected area of about 144, 196, or 256 square feet;~~

~~about 19 gallons per minute for a protected area of about 324 square feet; or about 24 gallons per minute for a protected area of about 400 square feet.~~

~~30. The method of claim 25, wherein identifying the fire protection information includes identifying the minimum flow rate comprises a plurality of flow rates for two residential pendent type sprinklers each with a rated K-factor of 4.2 when connected to respective dry pipes of the network of pipes in one of the plurality of design protection areas having a sloped ceiling with a maximum rise of eight inches per foot of run, the plurality of flow rates including about 14 gallons per minute for a protected area of about 144, 196, or 256 square feet; or about 18 gallons per minute for a protected area of about 324 square feet.~~

~~31. A method of specifying a residential sprinkler for use in a dry pipe sprinkler system of a residential unit having a plurality of compartments as defined in one or more of the 2002 National Fire Protection Association Standards 13, 13D, and 13R, the method comprising:~~

~~providing a residential fire sprinkler for installation in a network of pipes, the residential fire sprinkler being a type of at least one of vertically oriented and horizontally oriented satisfying actual fire tests in accordance with UL 1626 (October 2003), the actual fire test being performed in accordance with UL Standard 1626 (October 2003) and including a water delivery time of fifteen seconds following sprinkler activation for each type of residential fire sprinkler, the tests including three tests each being performed in an arrangement including:~~

~~a room with a nominally eight foot generally horizontal or flat ceiling and simulated furniture, the arrangement defining a rectangular shaped coverage area with first and second parallel walls whose length are longer than third and fourth walls that extend orthogonally to each of the first and second walls, the third and fourth walls being provided with a first~~

~~opening with 35 inches of width and a second opening with 41 inches of width, the tests including two sprinklers spaced apart over a first distance to provide liquid distribution over the coverage area and a third sprinkler proximate the second opening, the simulated furniture is oriented in an orthogonal configuration so as to generally surround a wood crib, one corner of the coverage area being distal to the first opening;~~

~~a first thermocouple being located 0.25 inches above the ceiling and 10 inches diagonally from the one corner;~~

~~a second thermocouple being located in the geometric center of the room and three inches below the ceiling;~~

~~a first of the fire testing arrangements being for a vertically-oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one-half L from the third wall with the first opening, a third sprinkler in the first testing arrangement being located three feet from the second wall and four inches from the second opening;~~

~~a second of the fire testing arrangements being for horizontally-oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one-half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one-half the width of the room, at three inches below the ceiling and 5 feet and one quarter inches above the floor; and~~

~~a third of the fire testing arrangements being for horizontally-oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one-half the width of the room, at three inches below the ceiling and 5 feet and one quarter inches above the floor, wherein~~

~~when further in the first, second, and third testing arrangements, a fire source is ignited in accordance with UL Standard 1626 (October 2003), the residential fire sprinklers provide a predetermined water flow rate over the coverage area to limit the maximum temperature measured by the second and third thermocouples to less than or equal to 600 degrees Fahrenheit (F), the maximum temperature measured by the third thermocouple to be less than or equal to 200 degrees F. and less than or equal to 130 degrees F for any continuous duration of more than two minutes, the maximum temperature measured by the first thermocouple being less than or equal to 500 degrees F.;~~

~~specifying a type of ceiling consonant with the specified sprinkler, the type of ceiling including: flat, sloped, beamed or a combination thereof;~~

~~specifying a coverage area for each type of ceiling specified, including specifying a plurality of design areas to be protected in the residential unit; and~~

~~identifying for the unit a dry design area and hydraulic demand for the dry pipe system based upon a minimum quantity and location of the residential sprinklers that are used to determine a hydraulic demand calculation for a wet system having a wet design area designed under guidelines set forth by at least one of 2002 National Fire Protection Association Standards 13, 13D and 13R, such that the hydraulic demand of the dry pipe system is the same as the hydraulic demand for the wet system and the dry design area of the dry system is the same as the wet design area of the wet system.~~

~~32. The method of claim 31, wherein identifying the hydraulic demand includes specifying at least one of the following:~~

~~(a) spacing between two or more of the residential fire sprinkler;~~

~~(b) rated K-factor of the at least one type of residential fire sprinkler from nominally 4 to 6;~~

~~(c) minimum flow rate per sprinkler;~~

~~(e) pressure of fluid being supplied to the at least one type of residential fire sprinkler; and~~

~~(f) temperature at which the at least one type of residential fire sprinkler activates.~~

~~33. The method of claim 31, wherein the specifying the type of ceiling and coverage area includes specifying a protection area measurement including at least one of 144 square feet; 196 square feet; 256 square feet; 288 square feet; 320 square feet; or 400 square feet.~~

~~34. The method of claim 31, wherein providing the residential sprinkler includes providing a sprinkler selected from a group consisting of one of residential pendant sprinkler having a rated K-factor of 5, sidewall sprinkler having a rated K-factor of 4, and combinations thereof.~~

~~35. The method of claim 31, wherein identifying the hydraulic demand includes identifying a plurality of minimum flow rates for a residential pendent type sprinkler with a rated K-factor of 4.9 when connected to at least one dry pipe of the network of pipes in one of the plurality of design protection areas having a horizontal ceiling with a maximum rise of two inches per foot of run, the plurality of flow rates including about 15 gallons per minute for a protected area of about 144, 196, or 256 square feet; about 17 gallons per minute for a protected area of about 324 square feet; or about 20 gallons per minute for a protected area of about 400 square feet.~~

~~36. The method of claim 31, wherein identifying the hydraulic demand includes identifying a plurality of minimum flow rates for a residential sidewall type sprinkler with a rated K-factor of 4.2 when connected to at least one dry pipe of the network of pipes in one of the plurality of protected areas, the plurality of flow rates including about at least 12 gallons per minute for a protected area of about 144 square feet; about at least 16 gallons per minute for a protected area of about 196 or 256 square feet; about at least 19 gallons per minute for a protected area of about 288 square feet; or about at least 23 gallons per minute for a protected area of about 320 square feet.~~

~~37. The method of claim 31, wherein identifying the hydraulic demand includes identifying a plurality of minimum flow rates for a residential pendent type sprinkler with a rated K-factor of 4.2 when connected to at least one dry~~

~~pipe of the network of pipes in one of the plurality of design protection areas having a horizontal ceiling with a maximum rise of two inches per foot of run, the plurality of flow rates including about 13 gallons per minute for a protected area of about 144, 196, or 256 square feet; about 18 gallons per minute for a protected area of about 324 square feet; or about 22 gallons per minute for a protected area of about 400 square feet.~~

~~38. The method of claim 31, wherein identifying the hydraulic demand includes identifying a plurality of minimum flow rates for a residential pendent type sprinkler with a rated K-factor of 4.2 when connected to at least one dry pipe of the network of pipes in one of the plurality of design protection areas having a sloped ceiling with a maximum rise of eight inches per foot of run, the plurality of flow rates including about 17 gallons per minute for a protected area of about 144, 196, or 256 square feet; about 19 gallons per minute for a protected area of about 324 square feet; or about 24 gallons per minute for a protected area of about 400 square feet.~~

~~39. The method of claim 31, wherein identifying the hydraulic demand includes identifying a plurality of minimum flow rates for two residential pendent type sprinklers each with a rated K-factor of 4.2 when connected to respective dry pipes of the network of pipes in one of the plurality of design protection areas having a sloped ceiling with a maximum rise of eight inches per foot of run, the plurality of flow rates including about 14 gallons per minute for a protected area of about 144, 196, or 256 square feet; or about 18 gallons per minute for a protected area of about 324 square feet.~~

~~40. The method of claim 31, wherein identifying the hydraulic demand is further based upon the type of ceiling specified such that identifying the hydraulic demand includes specifying the maximum spacing between residential sprinklers, a deflector to ceiling spacing for the residential sprinklers and a flow rate with a residual pressure for the residential sprinklers, the specifying a coverage area including specifying a maximum coverage area.~~

~~41. The method of claim 31, further comprising communicating over a suitable medium including a computer with a graphical user interface such that the providing, specifying and identifying facilitate a design process.~~

~~42. The method of claim 31, wherein specifying a plurality of design areas to be protected in the unit includes specifying that each of the areas defining a design protection area having a dimension of X by Y, wherein X is any value ranging from about 10 feet to about 20 feet and Y is any value ranging from about 10 feet to about 24 feet.~~

~~43. A method of designing a dry pipe residential fire protection system using hydraulic demand criteria of a wet pipe residential fire sprinkler system based on one or more fire protection standards, the dry system being for a residential dwelling unit having a fluid supply source defined by a flow and pressure and a plurality of compartments as defined in one or more of the fire protection standards, the fire protection standards being: 2002 National Fire Protection Association Standards 13, 13D, and 13R, the method comprising:~~

~~determining a minimum quantity and location of residential fire sprinklers meeting the approval requirements of at least one of the fire protection standards including UL 1626 (October 2003), so as to be approved for use in wet pipe residential fire protection systems for a piping network filled with water in a wet pipe fire sprinkler system arranged to protect the plurality of compartments as defined in one or more of the fire protection standards, the fire protection standards being: 2002 National Fire Protection Association Standards 13, 13D, and 13R, the determining of the minimum quantity and location of the residential sprinklers being based upon hydraulic demand design criteria for the wet system designed under guidelines set forth by the applicable fire protection standards for the unit, such that the determining the minimum quantity includes:~~

~~determining a wet design area of the wet pipe fire sprinkler system;~~

~~determining a number of sprinklers for the wet system so as to comply with a sprinkler coverage requirement for each compartment;~~

~~determining a hydraulic demand for each compartment in the wet system including determining the highest hydraulic demand of the wet system;~~

~~determining that the flow and pressure of the fluid supply source satisfies the highest hydraulic demand of the wet system; and~~

~~specifying the minimum quantity and location of residential fire sprinklers, as determined, for the dry system having a dry design area that is the same as the wet design area of the wet pipe fire sprinkler system.~~

~~44. A dry pipe residential fire protection system for a residential dwelling unit having a plurality of compartments as defined in one or more of the fire protection standards, the fire protection standards being: 2002 National Fire Protection Association Standards 13, 13D, and 13R, the system comprising:~~

~~a fluid supply located proximate the residential dwelling unit, the fluid supply having a flow and pressure;~~

~~a network of pipes coupled to the fluid supply, the network of pipes including at least one pipe extending over each of the compartments;~~

~~a minimum quantity of residential fire sprinklers meeting the approval requirements of at least one of the fire protection standards including UL 1626 (October 2003) for use in a wet pipe fire sprinkler system design for protection of the plurality of compartments designed under guidelines set forth by the applicable fire protection standards for the unit, the residential fire sprinklers having a location adjacent each of the compartments and coupled to the network of pipes so that upon actuation of at least one residential fire sprinkler, fluid is delivered from fluid supply to the compartments within a first time period, the location satisfying a hydraulic demand of the wet system design for each compartment as determined under the guidelines, the location further satisfying the highest hydraulic demand of the wet system design determined under the guidelines when the minimum number of residential sprinklers are supplied with a fluid from the fluid supply, the minimum quantity of residential sprinklers being equivalent to a number of sprinklers for the wet system design so as to comply with a sprinkler coverage requirement for each compartment under the guidelines; and~~

~~a dry design area that is the same as a wet design area in the wet pipe fire sprinkler system design.~~

~~45. The system of claim 44, wherein the hydraulic demand for the wet system for each compartment is defined by a hydraulic demand of a residential sprinkler, up to four sprinklers, for a design area of each compartment in the wet system design.~~

~~46. The system of claim 44, wherein the hydraulic demand for the wet system for each compartment is defined~~

~~by a hydraulic demand of a residential sprinkler, up to two sprinklers, for a design area of each compartment in the wet system design.~~

~~47. The system of claim 44, wherein the residential sprinklers are of a type of at least one of vertically oriented and horizontally oriented satisfying actual fire tests in accordance with UL 1626 (October 2003), the actual fire test being performed in accordance with UL Standard 1626 (October 2003) for each type of residential fire sprinkler including three tests each being performed in an arrangement including:~~

~~a room with nominally eight feet generally horizontal or flat ceiling and simulated furniture, the arrangement defining a rectangular-shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture is oriented in an orthogonal configuration so as to generally surround a wood crib, one corner of the coverage area being distal to the first opening;~~

~~a first thermocouple being located 0.25 inches above the ceiling and 10 inches diagonally from the one corner;~~

~~a second thermocouple being located in the geometric center of the room and three inches below the ceiling;~~

~~a first of the fire testing arrangements being for a vertically oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one half L from the third wall with the first opening, a third sprinkler in the first testing arrangement being located three feet from the second wall and four inches from the second opening;~~

~~a second of the fire testing arrangements being for horizontally oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one half the width of the room, at three inches below the ceiling and 5 feet and one quarter inches above the floor; and~~

~~a third of the fire testing arrangements being for horizontally oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one half the width of the room, at three inches below the ceiling and 5 feet and one quarter inches above the floor, wherein~~

~~when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F), the maximum temperature measured by the third thermocouple to be less than or equal to 200 degrees F. and less than or equal to 130 degrees F for any continuous duration of more than two minutes, the maximum temperature measured by the first thermocouple being less than or equal to 500 degrees F.~~

~~48. The system of claim 44, wherein the first time period comprises about 10 seconds.~~

~~49. The system of claim 44, wherein the first time period comprises about 15 seconds.~~

~~50. The system of claim 44, wherein the residential fire sprinklers include a residential pendant type fire sprinkler having a rated K-factor of at least nominally 4.~~

~~51. The system of claim 44, wherein the residential fire sprinkler comprises a residential sidewall sprinkler having a rated K-factor of at least nominally 4.~~

~~52. A residential dwelling unit fire protection system, the residential dwelling unit having a plurality of compartments as defined in the 2002 National Fire Protection Association Standard 13D, the fire protection system comprising:~~

~~a supply of pressurized fluid located proximate the dwelling unit;~~

~~a network of pipes in fluid communication with the fluid supply, the network of pipes including at least one pipe extending over each of the compartments, the at least one pipe being filled generally with a gas so that the at least one pipe is dry; and~~

~~a quantity of residential fire sprinklers located adjacent each of the compartments, each of the quantity of residential fire sprinklers being coupled to the at least one pipe filled with a gas so that, upon actuation of at least one fire sprinkler of the quantity of residential fire sprinklers, fluid is delivered from fluid supply to the compartments within a first time period, wherein the quantity of residential fire sprinklers is based on a calculated hydraulic demand for all residential fire sprinklers in a wet fire protection system, up to two sprinklers, having the highest calculated demand within a compartment.~~

~~53. A residential dwelling unit fire protection system, the residential dwelling unit having a plurality of compartments as defined in the 2002 National Fire Protection Association Standards 13 and 13R, the fire protection system comprising:~~

~~a supply of pressurized fluid located proximate the dwelling unit;~~

~~a network of pipes in fluid communication with the fluid supply, the network of pipes including at least one pipe extending over each of the compartments, the at least one pipe being filled generally with a gas so that the at least one pipe is dry; and~~

~~a quantity of residential fire sprinklers located adjacent each of the compartments, each of the quantity of residential fire sprinklers being coupled to the at least~~

~~one pipe filled with a gas so that, upon actuation of at least one fire sprinkler of the quantity of residential fire sprinklers, fluid is delivered from fluid supply to the compartments within a first time period, wherein the quantity of residential fire sprinklers is based on a calculated hydraulic demand for all residential fire sprinklers in a wet fire protection system, up to four sprinklers, having the highest calculated demand within a compartment.~~

~~54. The system of any one of claims 52 and 53, wherein the first time period comprises about 15 seconds.~~

~~55. The system of any one of claims 52 and 53, wherein the residential fire sprinklers include a residential pendant type fire sprinkler having a rated K-factor of at least nominally 4.~~

~~56. The system of any one of claims 52 and 53, wherein the residential fire sprinkler comprises a residential sidewall sprinkler having a rated K-factor of at least nominally 4.~~

*57. A method of designing a dry pipe residential fire protection system using hydraulic demand criteria of a wet pipe residential fire sprinkler system based on one or more fire protection standards, the dry system being for a residential dwelling unit having a fluid supply source defined by a flow and pressure and a plurality of compartments as defined in one or more of the fire protection standards, the fire protection standards being: 2002 National Fire Protection Association Standards 13, 13D, and 13R, the method comprising:*

*determining a minimum quantity and location of residential fire sprinklers meeting the approval requirements of at least one of the fire protection standards including UL 1626 (October 2003), so as to be approved for use in wet pipe residential fire protection systems for a piping network filled with water in a wet pipe fire sprinkler system arranged to protect the plurality of compartments as defined in one or more of the fire protection standards, the fire protection standards being: 2002 National Fire Protection Association Standards 13, 13D, and 13R, the determining of the minimum quantity and location of the residential sprinklers being based upon hydraulic demand design criteria for the wet system designed under guidelines set forth by the applicable fire protection standards for the unit, such that the determining of the minimum quantity includes:*

*determining a wet design area;*

*determining a number of sprinklers for the wet system so as to comply with a sprinkler coverage requirement for each compartment;*

*determining a hydraulic demand for each compartment in the wet system including determining the highest hydraulic demand of the wet system;*

*determining that the flow and pressure of the fluid supply source satisfies the highest hydraulic demand of the wet system;*

*specifying the minimum quantity and location of residential fire sprinklers, as determined, for the dry system having a dry design area that is the same as the wet design area; and*

*specifying a network of pipes to be filled with a pressurized gas so that the pipes are dry, the pressurized gas consisting of air, nitrogen or a combination thereof;*

*specifying the residential fire sprinklers for the dry system in which the residential sprinklers have a body with an inlet, an outlet defining a passageway between the inlet and the outlet along a sprinkler axis, a deflector affixed to the body so as to be spaced from and generally aligned with the outlet and the sprinkler axis, a closure positioned proximate the outlet and a heat responsive trigger to retain the closure proximate the outlet and occlude the passageway so that the passageway is filled with the pressurized gas when the residential sprinkler is coupled to the network of pipes and the heat responsive trigger is in an unactuated condition, wherein the residential sprinklers being a type of at least one of vertically-oriented and horizontally-oriented satisfying actual fire tests in accordance with UL Standard 1626 (October 2003), the actual fire test being performed in accordance with UL Standard 1626 (October 2003) for each type of residential fire sprinkler including three tests each being performed in an arrangement including:*

*a room with nominally eight feet generally horizontal or flat ceiling and simulated furniture, the arrangement defining a rectangular-shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture being oriented in an orthogonal configuration so as to generally surround a wood crib, one corner of the coverage area being distal to the first opening;*

*a first thermocouple being located 0.25 inches above the ceiling and 10 inches diagonally from the one corner;*

*a second thermocouple being located in the geometric center of the room and three inches below the ceiling;*

*a first of the fire testing arrangements being for a vertically-oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one-half L from the third wall with the first opening, a third sprinkler in the first testing arrangement being located three feet from the second wall and four inches from the second opening;*

*a second of the fire testing arrangements being for horizontally-oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one-half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one-half the width of the room, at three inches below the ceiling and 5 feet and one-quarter inches above the floor; and*

*a third of the fire testing arrangements being for horizontally-oriented type sprinklers, first and second sprinklers of the third fire testing arrangement being mounted in the wall proximal to the simulated furniture and spaced apart over a distance W along the proximal*

*wall, a third thermocouple of the third testing arrangement being located directly across from the first sprinkler of the third testing arrangement at a distance of one-half the width of the room, at three inches below the ceiling and 5 feet and one-quarter inches above the floor, wherein when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F.), the maximum temperature measured by the third thermocouple to be less than or equal to 200 degrees F. and less than or equal to 130 degrees F. for any continuous duration of more than two minutes, the maximum temperature measured by the first thermocouple being less than or equal to 500 degrees F.*

*58. The method of claim 57, wherein the determining includes selecting the residential sprinklers at a rated K-factor appropriate for the pressure and flow rate of the fluid supply source.*

*59. The method of claim 58, wherein specifying comprises calculating the hydraulic flow rate of the selected residential fire sprinkler from the fluid supply source to the selected residential fire sprinkler to determine whether the selected fire sprinkler, up to a maximum of two, within a compartment of the residential dwelling unit, requires the highest hydraulic flow rate.*

*60. The method of claim 58, wherein specifying comprises calculating the hydraulic flow rate of the selected residential fire sprinkler from the fluid supply source to the selected residential fire sprinkler to determine whether the selected fire sprinkler, up to a maximum of four, within a compartment of the residential dwelling unit, requires the highest hydraulic flow rate.*

*61. The method of one of claims 59 and 60, wherein the specifying comprises selecting residential fire sprinklers at a nominal rated K-factor selected from a group of rated K-factors consisting of 3.0, 3.9, 4.1, 4.2, 4.3, 4.4, 4.7, 4.9, 5.5, and 5.6.*

*62. The method of claim 61, wherein calculating the hydraulic flow rate provides a flow of water in gallons per minute selected from a group of flow rates consisting of 12, 13, 14, 16, 17, 18, 19, 20, 21, 23, 24, 25, 26, 27, and 28 gallons per minute.*

*63. A method of designing a dry pipe residential fire protection system using the hydraulic demand criteria of a wet pipe residential fire sprinkler system based on one or more fire protection standards, the standards being: 2002 National Fire Protection Association Standards 13, 13D, and 13R, the system being for a residential dwelling unit having a plurality of compartments as defined in the 2002 National Fire Protection Association Standards 13D, the method comprising:*

*determining a wet design area of the wet system and a minimum number of residential fire sprinklers meeting the approval requirements of at least one or more of the fire protection standards including UL Standard 1626 (October 2003) so as to be approved for use in wet pipe residential fire protection systems based on a hydraulic demand calculation of the wet pipe fire sprinkler system, the hydraulic demand calculation being a function of up to two sprinklers located within at least one of the plurality of compartments of the residential dwelling unit, as defined in the 2002 National Fire Protection Association Standards 13D, the hydraulic demand calculation of the wet pipe fire sprinkler system being based upon hydraulic demand design criteria for a wet system designed under guidelines set forth by 2002 National Fire Protection Association Standards 13D, wherein determining the minimum quantity of residential fire sprinklers based upon the hydraulic demand calculation of the wet system includes;*

*determining a number of sprinklers for the wet system so as to comply with the preselected density;*

*determining a hydraulic demand for each compartment in the wet system including determining the highest hydraulic demand of the wet system;*

*determining that the flow rate of the liquid supply source satisfies the highest hydraulic demand of the wet system; and*

*specifying the minimum quantity and location of residential fire sprinklers, as determined, in the dry system, the dry system having a dry design area the same as the wet design area for the wet system, the dry system including:*

*(a) a water supply source to provide sufficient water flow rate to a network of pipes so as to maintain a preselected density under NFPA 13D for a predetermined duration;*

*(b) a single control valve;*

*(c) a dry pipe valve; and*

*(d) a network of pipes to be filled with a pressurized gas consisting of air, nitrogen or a combination thereof when the residential sprinklers are in an unactuated condition so that the pipes are dry,*

*specifying the residential fire sprinklers for the dry system in which the residential sprinklers have a body with an inlet, an outlet defining a passageway between the inlet and the outlet along a sprinkler axis, a deflector affixed to the body so as to be spaced from and generally aligned with the outlet and the sprinkler axis, a closure positioned proximate the outlet and a heat responsive trigger to retain the closure proximate the outlet and occlude the passageway so that the passageway is filled with the pressurized gas when the residential sprinkler is coupled to the network of pipes and the heat responsive trigger is in an unactuated condition, the residential sprinklers being a type of at least one of vertically-oriented and horizontally-oriented satisfying actual fire tests in accordance with UL Standard 1626 (October 2003), the actual fire test being performed in accordance with UL Standard 1626 (October 2003) for each type of residential fire sprinkler including three tests each being performed in an arrangement including:*

*a room with nominally eight feet generally horizontal or flat ceiling and simulated furniture, the arrangement defining a rectangular-shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture being oriented in an orthogonal configuration so as to generally surround a wood crib, one corner of the coverage area being distal to the first opening;*

*a first thermocouple being located 0.25 inches above the ceiling and 10 inches diagonally from the one corner;*

*a second thermocouple being located in the geometric center of the room and three inches below the ceiling;*

*a first of the fire testing arrangements being for a vertically-oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one-half L from the third wall with the first opening, a third sprinkler in the first testing arrangement being located three feet from the second wall and four inches from the second opening; a second of the fire testing arrangements being for horizontally-oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one-half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one-half the width of the room, at three inches below the ceiling and 5 feet and one-quarter inches above the floor; and*

*a third of the fire testing arrangements being for horizontally-oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one-half the width of the room, at three inches below the ceiling and 5 feet and one-quarter inches above the floor, wherein*

*when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F), the maximum temperature measured by the third thermocouple to be less than or equal to 200 degrees F. and less than or equal to 130 degrees F. for any continuous duration of more than two minutes, the maximum temperature measured by the first thermocouple being less than or equal to 500 degrees F.*

*64. A method of designing a dry pipe residential fire protection system using the hydraulic demand criteria of a wet pipe residential fire sprinkler system based on one or more fire protection standards, the standards being: 2002 National Fire Protection Association Standards 13, 13D, and 13R, the system being for a residential dwelling unit having a plurality of compartments as defined in the 2002 National Fire Protection Association Standards 13 and 13R, the method comprising:*

*determining a wet design area of the wet system and a minimum number of residential fire sprinklers meeting the approval requirements of at least one or more of the fire protection standards including UL Standard 1626 (October 2003) so as to be approved for use in wet pipe residential fire protection systems based on a hydraulic demand calculation of a wet pipe fire sprinkler system, the hydraulic demand calculation being a function of up to four sprinklers located within at least one of the plurality of compartments of the residential dwelling unit, as defined in the 2002 National Fire Protection Association Standards 13 and 13R, the hydraulic demand calculation of the wet pipe fire sprinkler system being based upon hydraulic demand design criteria for a wet system designed under guidelines set forth by 2002 National Fire Protection Association Standards 13 and 13R, wherein determining the minimum quantity of residential fire sprinklers based upon the hydraulic demand calculation of the wet system includes:*

*determining a number of sprinklers for the wet system so as to comply with the preselected density;*

*determining a hydraulic demand for each compartment in the wet system including determining the highest hydraulic demand of the wet system;*

*determining that the flow rate of the liquid supply source satisfies the highest hydraulic demand of the wet system; and*

*specifying the minimum quantity and location of residential fire sprinklers, as determined, in the dry system, the dry system having a dry design area the same as the wet design area for the wet system, the dry system including:*

*(a) a water supply source to provide sufficient water flow rate to a network of pipes so as to maintain a preselected density under NFPA 13 and 13R for a predetermined duration;*

*(b) a single control valve;*

*(c) a dry pipe valve; and*

*(d) a network of pipes to be filled with a pressurized gas consisting of air, nitrogen or a combination thereof when the residential sprinklers are in an unactuated condition so that the pipes are dry,*

*specifying the residential fire sprinklers for the dry system in which the residential sprinklers have a body with an inlet, an outlet defining a passageway between the inlet and the outlet along a sprinkler axis, a deflector affixed to the body so as to be spaced from and generally aligned with the outlet and the sprinkler axis, a closure positioned proximate the outlet and a heat responsive trigger to retain the closure proximate the outlet and occlude the passageway so that the passageway is filled with the pressurized gas when the residential sprinkler is coupled to the network of pipes and the heat responsive trigger is in an unactuated condition, the residential sprinklers being a type of at least one of vertically-oriented and horizontally-oriented satisfying actual fire tests in accordance with UL Standard 1626 (October 2003), the actual fire test being performed in accordance with UL Standard 1626 (October 2003) for each type of residential fire sprinkler including three tests each being performed in an arrangement including:*

*a room with nominally eight feet generally horizontal or flat ceiling and simulated furniture, the arrangement defining a rectangular-shaped coverage area with first and second parallel walls whose length are longer than third and fourth walls that extend orthogonally to each of the first and second walls, the third and fourth walls*

*being provided with a first opening with 35 inches of width and a second opening with 41 inches of width, the tests including two sprinklers spaced apart over a first distance to provide liquid distribution over the coverage area and a third sprinkler proximate the second opening, the simulated furniture being oriented in an orthogonal configuration so as to generally surround a wood crib, one corner of the coverage area being distal to the first opening;*

*a first thermocouple being located 0.25 inches above the ceiling and 10 inches diagonally from the one corner;*

*a second thermocouple being located in the geometric center of the room and three inches below the ceiling;*

*a first of the fire testing arrangements being for a vertically-oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one-half L from the third wall with the first opening, a third sprinkler in the first testing arrangement being located three feet from the second wall and four inches from the second opening;*

*a second of the fire testing arrangements being for horizontally-oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one-half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one-half the width of the room, at three inches below the ceiling and 5 feet and one-quarter inches above the floor; and*

*a third of the fire testing arrangements being for horizontally-oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one-half the width of the room, at three inches below the ceiling and 5 feet and one-quarter inches above the floor, wherein*

*when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F.), the maximum temperature measured by the third thermocouple to be less than or equal to 200 degrees F. and less than or equal to 130 degrees F. for any continuous duration of more than two minutes, the maximum temperature measured by the first thermocouple being less than or equal to 500 degrees F.*

*65. The method of one of claims 57, 63 and 64, wherein the specifying comprises identifying: at least one type of residential fire sprinkler to be used in the dwelling unit; a plurality of protection areas to be protected by the at least one type of residential fire sprinkler in the dwelling unit, each of the plurality of protection areas having a dimension of X by Y, wherein X is any value from 10 feet to 20 feet and Y is any value from 10 feet to 24 feet; and a plurality of minimum flow rates and residual pressures for a respective one of a plurality of protection areas.*

*66. The method of claim 65, wherein identifying the plurality of protection areas includes relating the plurality of protection areas to at least one of the following: (a) spacing between any two of the at least one type of residential fire sprinklers; (b) a type of ceiling over a protection area; (c) rated K-factor of the at least one type of residential fire sprinkler; (d) minimum flow rate per sprinkler; (e) pressure of fluid being supplied to the at least one type of residential fire sprinkler; and (f) temperature at which the at least one type of residential fire sprinkler activates.*

*67. The method of claim 66, wherein identifying the plurality of protection areas comprises identifying a protection area for at least one of a generally flat, sloped or beamed ceiling, and the protection area includes at least one of 144 square feet; 196 square feet; 256 square feet; 288 square feet; 320 square feet; or 400 square feet.*

*68. The method of claim 67, wherein relating the rated K-factor comprises relating a plurality of rated K-factors including nominal K-factors of 4 and 5.*

*69. The method of claim 68, wherein relating the at least one type of residential fire sprinklers comprises relating a fire sprinkler selected from a group consisting of one of a pendant sprinkler having a rated K-factor of 5, a sidewall sprinkler having a rated K-factor of 4, and combinations thereof.*

*70. The method of claim 69, wherein relating the minimum flow rate comprises relating a plurality of flow rates for a pendent type sprinkler with a rated K-factor of 4.9 when connected to at least one dry pipe of the network of pipes in one of the plurality of design protection areas having a horizontal ceiling with a maximum rise of two inches per foot of run, the plurality of flow rates including about 15 gallons per minute for a protected area of about 144, 196, or 256 square feet; about 17 gallons per minute for a protected area of about 324 square feet; or about 20 gallons per minute for a protected area of about 400 square feet.*

*71. The method of claim 70, wherein relating the minimum flow rate comprises relating a plurality of flow rates for a sidewall type sprinkler with a rated K-factor of 4.2 when connected to at least one dry pipe of the network of pipes in one of the plurality of protected areas, the plurality of flow rates including about at least 12 gallons per minute for a protected area of about 144 square feet; about at least 16 gallons per minute for a protected area of about 196 or 256 square feet; about at least 19 gallons per minute for a protected area of about 288 square feet; or about at least 23 gallons per minute for a protected area of about 320 square feet.*

*72. The method of claim 69, wherein relating the minimum flow rate comprises relating a plurality of flow rates for a pendent type sprinkler with a rated K-factor of 4.2 when connected to at least one dry pipe of the network of pipes in one of the plurality of design protection areas having a horizontal ceiling with a maximum rise of two inches per foot of run, the plurality of flow rates including about 13 gallons per minute for a protected area of about 144, 196, or 256 square feet; about 18 gallons per minute for a*

*protected area of about 324 square feet; or about 22 gallons per minute for a protected area of about 400 square feet.*

*73. The method of claim 69, wherein relating the minimum flow rate comprises relating a plurality of flow rates for a pendent type sprinkler with a rated K-factor of 4.2 when connected to at least one dry pipe of the network of pipes in one of the plurality of design protection areas having a sloped ceiling with a maximum rise of eight inches per foot of run, the plurality of flow rates including about 17 gallons per minute for a protected area of about 144, 196, or 256 square feet; about 19 gallons per minute for a protected area of about 324 square feet; or about 24 gallons per minute for a protected area of about 400 square feet.*

*74. The method of claim 69, wherein relating the minimum flow rate comprises relating a plurality of flow rates for two pendent type sprinklers each with a rated K-factor of 4.2 when connected to respective dry pipes of the network of pipes in one of the plurality of design protection areas having a sloped ceiling with a maximum rise of eight inches per foot of run, the plurality of flow rates including about 14 gallons per minute for a protected area of about 144, 196, or 256 square feet; or about 18 gallons per minute for a protected area of about 324 square feet.*

*75. The method of claim 74, wherein the specifying comprises providing a density of at least 0.1 gallons per minute per square feet.*

*76. The method of claim 74, wherein the specifying comprises providing a density of at least 0.05 gallons per minute per square feet to each of the minimum quantity of residential fire sprinklers.*

*77. A method comprising: identifying fire protection information for a residential dwelling unit as defined in the 2002 National Fire Protection Association Standards 13, 13D, and 13R, the fire protection information including:*

*at least one type of residential fire sprinkler for each of a plurality of areas to be protected, including a rated K-factor for the fire sprinkler, the at least one type of residential fire sprinkler being configured for coupling to a network of pipes to be filled with a pressurized gas when the residential sprinklers are in an unactuated condition so that the pipes are dry, the pressurized gas consisting of air, nitrogen or a combination thereof, the residential fire sprinkler having a body with an inlet, an outlet defining a passageway between the inlet and the outlet along a sprinkler axis, a deflector affixed to the body so as to be spaced from and generally aligned with the outlet and the sprinkler axis, a closure positioned proximate the outlet and a heat responsive trigger to retain the closure proximate the outlet and occlude the passageway so that the passageway is filled with the pressurized gas when the residential sprinkler is coupled to the network of pipes and the heat responsive trigger is in an unactuated condition, the residential sprinkler being a type of at least one of vertically-oriented and horizontally-oriented satisfying actual fire tests in accordance with UL Standard 1626 (October 2003), the actual fire test being performed in accordance with UL Standard 1626 (October 2003) for each type of residential fire sprinkler including three tests each being performed in an arrangement including:*

*a room with nominally eight feet generally horizontal or flat ceiling and simulated furniture, the arrangement defining a rectangular-shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture being oriented in an orthogonal configuration so as to generally surround a wood crib, one corner of the coverage area being distal to the first opening;*

*a first thermocouple being located 0.25 inches above the ceiling and 10 inches diagonally from the one corner;*

*a second thermocouple being located in the geometric center of the room and three inches below the ceiling;*

*a first of the fire testing arrangements being for a vertically-oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one-half L from the third wall with the first opening, a third sprinkler in the first testing arrangement being located three feet from the second wall and four inches from the second opening;*

*a second of the fire testing arrangements being for horizontally-oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one-half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one-half the width of the room, at three inches below the ceiling and 5 feet and one-quarter inches above the floor;*

*and a third of the fire testing arrangements being for horizontally-oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one-half the width of the room, at three inches below the ceiling and 5 feet and one-quarter inches above the floor, wherein*

*when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F.), the maximum temperature measured by the third thermocouple to be less than or equal to 200 degrees F. and less than or equal to 130 degrees F. for any continuous duration of more than two minutes, the maximum*

*temperature measured by the first thermocouple being less than or equal to 500 degrees F.;*

*a plurality of areas to be protected in the dwelling unit, each of the plurality of design protection areas having a dimension of X by Y, wherein X is any value from 10 feet to 20 feet and Y is any value from 10 feet to 24 feet; and*

*a plurality of minimum flow rates and residual pressures to identify a hydraulic demand for a wet pipe system based upon hydraulic demand design criteria including a wet design area for the wet system designed under guidelines set forth by at least one of 2002 National Fire Protection Association Standards 13, 13D and 13R so as to define a hydraulic demand for a dry pipe system configured to protect the plurality of areas, the hydraulic demand of the dry system being the same as hydraulic demand of the wet pipe system; and*

*directing a user to design a dry pipe residential fire protection system having a dry design area based on the fire protection information such that the dry design area of the dry pipe system is the same as the wet design area of the wet pipe system.*

*78. The method of claim 77, wherein identifying the fire protection information comprises specifying at least one of the following: (a) type of ceiling over each of the design protection area; (b) spacing between any two of the at least one type of residential fire sprinklers; (c) rated K-factor of the at least one type of residential fire sprinkler from nominally 4 to 6; (d) minimum flow rate per sprinkler; (e) pressure of fluid being supplied to the at least one type of residential fire sprinkler; and (f) temperature at which the at least one type of residential fire sprinkler activates.*

*79. The method of claim 78, wherein specifying the type of ceiling includes specifying at least one of a generally flat, sloped or beamed ceiling, and the identifying the fire protection information further includes specifying a protection area measurement as including at least one of 144 square feet; 196 square feet; 256 square feet; 288 square feet; 320 square feet; or 400 square feet.*

*80. The method of claim 79, wherein specifying the rated K-factor comprises specifying a plurality of rated K-factors including nominally 4 and 5.*

*81. The method of claim 79, wherein identifying the fire protection information includes identifying the at least one type of residential fire sprinklers as comprising a fire sprinkler selected from a group consisting of one of residential pendant sprinkler having a rated K-factor of 5, sidewall sprinkler having a rated K-factor of 4, and combinations thereof.*

*82. The method of claim 81, wherein identifying the fire protection information includes identifying the minimum flow rate comprises a plurality of flow rates for a residential pendent type sprinkler with a rated K-factor of 4.9 when connected to at least one dry pipe of the network of pipes in one of the plurality of design protection areas having a horizontal ceiling with a maximum rise of two inches per foot of run, the plurality of flow rates including about 15 gallons per minute for a protected area of about 144, 196, or 256 square feet; about 17 gallons per minute for a protected area of about 324 square feet; or about 20 gallons per minute for a protected area of about 400 square feet.*

*83. The method of claim 81, wherein identifying the fire protection information includes identifying the minimum flow rate comprises a plurality of flow rates for a residential sidewall type sprinkler with a rated K-factor of 4.2 when connected to at least one dry pipe of the network of pipes in one of the plurality of protected areas, the plurality of flow rates including about at least 12 gallons per minute for a protected area of about 144 square feet; about at least 16 gallons per minute for a protected area of about 196 or 256 square feet; about at least 19 gallons per minute for a protected area of about 288 square feet; or about at least 23 gallons per minute for a protected area of about 320 square feet.*

*84. The method of claim 81, wherein identifying the fire protection information includes identifying the minimum flow rate comprises a plurality of flow rates for a residential pendent type sprinkler with a rated K-factor of 4.2 when connected to at least one dry pipe of the network of pipes in one of the plurality of design protection areas having a horizontal ceiling with a maximum rise of two inches per foot of run, the plurality of flow rates including about 13 gallons per minute for a protected area of about 144, 196, or 256 square feet; about 18 gallons per minute for a protected area of about 324 square feet; or about 22 gallons per minute for a protected area of about 400 square feet.*

*85. The method of claim 81, wherein identifying the fire protection information includes identifying the minimum flow rate comprises a plurality of flow rates for a residential pendent type sprinkler with a rated K-factor of 4.2 when connected to at least one dry pipe of the network of pipes in one of the plurality of design protection areas having a sloped ceiling with a maximum rise of eight inches per foot of run, the plurality of flow rates including about 17 gallons per minute for a protected area of about 144, 196, or 256 square feet; about 19 gallons per minute for a protected area of about 324 square feet; or about 24 gallons per minute for a protected area of about 400 square feet.*

*86. The method of claim 81, wherein identifying the fire protection information includes identifying the minimum flow rate comprises a plurality of flow rates for two residential pendent type sprinklers each with a rated K-factor of 4.2 when connected to respective dry pipes of the network of pipes in one of the plurality of design protection areas having a sloped ceiling with a maximum rise of eight inches per foot of run, the plurality of flow rates including about 14 gallons per minute for a protected area of about 144, 196, or 256 square feet; or about 18 gallons per minute for a protected area of about 324 square feet.*

*87. A method of specifying a residential sprinkler for use in a dry pipe sprinkler system of a residential unit having a plurality of compartments as defined in one or more of the 2002 National Fire Protection Association Standards 13, 13D, and 13R, the method comprising:*

*providing a residential fire sprinkler for installation in a network of pipes to be filled with a pressurized gas when the residential sprinkler is in an unactuated condition so that the pipes are dry, the pressurized gas consisting of air, nitrogen or a combination thereof, the residential sprinkler having a body with an inlet, an outlet defining a passageway between the inlet and the outlet along a sprinkler axis, a deflector affixed to the body so as to be spaced from and generally aligned with the outlet and the sprinkler axis, a closure positioned proximate the outlet and a heat responsive trigger to retain the closure proximate the outlet and occlude the passageway so that the passageway is filled with the pressurized gas when the residential sprinkler is coupled to the network of pipes and the heat responsive trigger is in an unactuated condition, the residential fire sprinkler being a type of at least one of vertically-oriented and horizontally-oriented satisfying actual fire tests in accordance with UL Standard 1626 (October 2003), the actual fire test being performed in*

*accordance with UL Standard 1626 (October 2003) and including a water delivery time of fifteen seconds following sprinkler activation for each type of residential fire sprinkler, the tests including three tests each being performed in an arrangement including:*

*a room with a nominally eight foot generally horizontal or flat ceiling and simulated furniture, the arrangement defining a rectangular-shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture being oriented in an orthogonal configuration so as to generally surround a wood crib, one corner of the coverage area being distal to the first opening;*

*a first thermocouple being located 0.25 inches above the ceiling and 10 inches diagonally from the one corner;*

*a second thermocouple being located in the geometric center of the room and three inches below the ceiling;*

*a first of the fire testing arrangements being for a vertically-oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one-half L from the third wall with the first opening, a third sprinkler in the first testing arrangement being located three feet from the second wall and four inches from the second opening;*

*a second of the fire testing arrangements being for horizontally-oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one-half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one-half the width of the room, at three inches below the ceiling and 5 feet and one-quarter inches above the floor;*

*and a third of the fire testing arrangements being for horizontally-oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one-half the width of the room, at three inches below the ceiling and 5 feet and one-quarter inches above the floor, wherein*

*when further in the first, second, and third testing arrangements, a fire source is ignited in accordance with UL Standard 1626 (October 2003), the residential fire sprinklers provide a predetermined water flow rate over the coverage area to limit the maximum temperature measured by the second and third thermocouples to less than or equal to 600 degrees Fahrenheit (F.), the maximum temperature measured by the third thermocouple to be less than or equal to 200 degrees F. and less than or equal to 130 degrees F. for any continuous duration of more than two minutes, the maximum temperature measured by the first thermocouple being less than or equal to 500 degrees F.;*

*specifying a type of ceiling consonant with the specified sprinkler, the type of ceiling including: flat, sloped, beamed or a combination thereof;*

*specifying a coverage area for each type of ceiling specified, including specifying a plurality of design areas to be protected in the residential unit; and*

*identifying for the unit a dry design area and hydraulic demand for the dry pipe system based upon a minimum quantity and location of the residential sprinklers that are used to determine a hydraulic demand calculation for a wet system having a wet design area designed under guidelines set forth by at least one of 2002 National Fire Protection Association Standards 13, 13D and 13R, such that the hydraulic demand of the dry pipe system is the same as the hydraulic demand for the wet system and the dry design area of the dry system is the same as the wet design area of the wet system.*

*88. The method of claim 87, wherein identifying the hydraulic demand includes specifying at least one of the following: (a) spacing between two or more of the residential fire sprinkler; (b) rated K-factor of the at least one type of residential fire sprinkler from nominally 4 to 6; (c) minimum flow rate per sprinkler; (e) pressure of fluid being supplied to the at least one type of residential fire sprinkler; and (f) temperature at which the at least one type of residential fire sprinkler activates.*

*89. The method of claim 87, wherein the specifying the type of ceiling and coverage area includes specifying a protection area measurement including at least one of 144 square feet; 196 square feet; 256 square feet; 288 square feet; 320 square feet; or 400 square feet.*

*90. The method of claim 87, wherein providing the residential sprinkler includes providing a sprinkler selected from a group consisting of one of residential pendant sprinkler having a rated K-factor of 5, sidewall sprinkler having a rated K-factor of 4, and combinations thereof.*

*91. The method of claim 87, wherein identifying the hydraulic demand includes identifying a plurality of minimum flow rates for a residential pendent type sprinkler with a rated K-factor of 4.9 when connected to at least one dry pipe of the network of pipes in one of the plurality of design protection areas having a horizontal ceiling with a maximum rise of two inches per foot of run, the plurality of flow rates including about 15 gallons per minute for a protected area of about 144, 196, or 256 square feet; about 17 gallons per minute for a protected area of about 324 square feet; or about 20 gallons per minute for a protected area of about 400 square feet.*

*92. The method of claim 87, wherein identifying the hydraulic demand includes identifying a plurality of minimum flow rates for a residential sidewall type sprinkler with a rated K-factor of 4.2 when connected to at least one dry pipe of the network of pipes in one of the plurality of protected areas, the plurality of flow rates including about at*

*least 12 gallons per minute for a protected area of about 144 square feet; about at least 16 gallons per minute for a protected area of about 196 or 256 square feet; about at least 19 gallons per minute for a protected area of about 288 square feet; or about at least 23 gallons per minute for a protected area of about 320 square feet.*

*93. The method of claim 87, wherein identifying the hydraulic demand includes identifying a plurality of minimum flow rates for a residential pendent type sprinkler with a rated K-factor of 4.2 when connected to at least one dry pipe of the network of pipes in one of the plurality of design protection areas having a horizontal ceiling with a maximum rise of two inches per foot of run, the plurality of flow rates including about 13 gallons per minute for a protected area of about 144, 196, or 256 square feet; about 18 gallons per minute for a protected area of about 324 square feet; or about 22 gallons per minute for a protected area of about 400 square feet.*

*94. The method of claim 87, wherein identifying the hydraulic demand includes identifying a plurality of minimum flow rates for a residential pendent type sprinkler with a rated K-factor of 4.2 when connected to at least one dry pipe of the network of pipes in one of the plurality of design protection areas having a sloped ceiling with a maximum rise of eight inches per foot of run, the plurality of flow rates including about 17 gallons per minute for a protected area of about 144, 196, or 256 square feet; about 19 gallons per minute for a protected area of about 324 square feet; or about 24 gallons per minute for a protected area of about 400 square feet.*

*95. The method of claim 87, wherein identifying the hydraulic demand includes identifying a plurality of minimum flow rates for two residential pendent type sprinklers each with a rated K-factor of 4.2 when connected to respective dry pipes of the network of pipes in one of the plurality of design protection areas having a sloped ceiling with a maximum rise of eight inches per foot of run, the plurality of flow rates including about 14 gallons per minute for a protected area of about 144, 196, or 256 square feet; or about 18 gallons per minute for a protected area of about 324 square feet.*

*96. The method of claim 87, wherein identifying the hydraulic demand is further based upon the type of ceiling specified such that identifying the hydraulic demand includes specifying the maximum spacing between residential sprinklers, a deflector to ceiling spacing for the residential sprinklers and a flow rate with a residual pressure for the residential sprinklers, the specifying a coverage area including specifying a maximum coverage area.*

*97. The method of claim 87, further comprising communicating over a suitable medium including a computer with a graphical user interface such that the providing, specifying and identifying facilitate a design process.*

*98. The method of claim 87, wherein specifying a plurality of design areas to be protected in the unit includes specifying that each of the areas defining a design protection area having a dimension of X by Y, wherein X is any value ranging from about 10 feet to about 20 feet and Y is any value ranging from about 10 feet to about 24 feet.*

*99. A method of designing a dry pipe residential fire protection system using hydraulic demand criteria of a wet pipe residential fire sprinkler system based on one or more fire protection standards, the dry system being for a residential dwelling unit having a fluid supply source defined by a flow and pressure and a plurality of compartments as defined in one or more of the fire protection standards, the fire protection standards being: 2002 National Fire Protection Association Standards 13, 13D, and 13R, the method comprising:*

*determining a minimum quantity and location of residential fire sprinklers for installation in a network of pipes to be filled with a pressurized gas when the residential sprinklers are in an unactuated condition so that the pipes are dry, the pressurized gas consisting of air, nitrogen or a combination thereof, the residential sprinkler having a body with an inlet, an outlet defining a passageway between the inlet and the outlet along a sprinkler axis, a deflector affixed to the body so as to be spaced from and generally aligned with the outlet and the sprinkler axis, a closure positioned proximate the outlet and a heat responsive trigger to retain the closure proximate the outlet and occlude the passageway so that the passageway is filled with the pressurized gas when the residential sprinkler is coupled to the network of pipes and the heat responsive trigger is in an unactuated condition, the residential fire sprinklers meeting the approval requirements of at least one of the fire protection standards including UL Standard 1626 (October 2003), so as to be approved for use in wet pipe residential fire protection systems for a piping network filled with water in a wet pipe fire sprinkler system arranged to protect the plurality of compartments as defined in one or more of the fire protection standards, the fire protection standards being: 2002 National Fire Protection Association Standards 13, 13D, and 13R, the determining of the minimum quantity and location of the residential sprinklers being based upon hydraulic demand design criteria for the wet system designed under guidelines set forth by the applicable fire protection standards for the unit, such that the determining the minimum quantity includes: determining a wet design area of the wet pipe fire sprinkler system;*

*determining a number of sprinklers for the wet system so as to comply with a sprinkler coverage requirement for each compartment;*

*determining a hydraulic demand for each compartment in the wet system including determining the highest hydraulic demand of the wet system;*

*determining that the flow and pressure of the fluid supply source satisfies the highest hydraulic demand of the wet system; and*

*specifying the minimum quantity and location of residential fire sprinklers, as determined, for the dry system having a dry design area that is the same as the wet design area of the wet pipe fire sprinkler system.*

*100. A dry pipe residential fire protection system for a residential dwelling unit having a plurality of compartments as defined in one or more of the fire protection standards, the fire protection standards being: 2002 National Fire Protection Association Standards 13, 13D, and 13R, the system comprising:*

*a fluid supply located proximate the residential dwelling unit, the fluid supply having a flow and pressure;*

*a network of pipes coupled to the fluid supply, the network of pipes including at least one pipe extending over each of the compartments, the network of pipes to be filled with a pressurized gas so that the pipes are dry, the pressurized gas consisting of air, nitrogen or a combination thereof;*

*a minimum quantity of residential fire sprinklers, each of the residential fire sprinklers having a body with an inlet, an outlet defining a passageway between the inlet*

*and the outlet along a sprinkler axis, a deflector affixed to the body so as to be spaced from and generally aligned with the outlet and the sprinkler axis, a closure positioned proximate the outlet and a heat responsive trigger to retain the closure proximate the outlet and occlude the passageway so that the passageway is filled with the pressurized gas when the residential sprinkler is coupled to the network of pipes and the heat responsive trigger is in an unactuated condition, the residential fire sprinklers meeting the approval requirements of at least one of the fire protection standards including UL Standard 1626 (October 2003) for use in a wet pipe fire sprinkler system design for protection of the plurality of compartments designed under guidelines set forth by the applicable fire protection standards for the unit, the residential fire sprinklers having a location adjacent each of the compartments and coupled to the network of pipes so that, upon actuation of at least one residential fire sprinkler, fluid is delivered from fluid supply to the compartments within a first time period, the location satisfying a hydraulic demand of the wet system design for each compartment as determined under the guidelines, the location further satisfying the highest hydraulic demand of the wet system design determined under the guidelines when the minimum number of residential sprinklers are supplied with a fluid from the fluid supply, the minimum quantity of residential sprinklers being equivalent to a number of sprinklers for the wet system design so as to comply with a sprinkler coverage requirement for each compartment under the guidelines; and*

*a dry design area that is the same as a wet design area in the wet pipe fire sprinkler system design.*

*101. The system of claim 100, wherein the hydraulic demand for the wet system for each compartment is defined by a hydraulic demand of a residential sprinkler, up to four sprinklers, for a design area of each compartment in the wet system design.*

*102. The system of claim 100, wherein the hydraulic demand for the wet system for each compartment is defined by a hydraulic demand of a residential sprinkler, up to two sprinklers, for a design area of each compartment in the wet system design.*

*103. The system of claim 100, wherein the residential sprinklers are of a type of at least one of vertically-oriented and horizontally-oriented satisfying actual fire tests in accordance with UL 1626 (October 2003), the actual fire test being performed in accordance with UL Standard 1626 (October 2003) for each type of residential fire sprinkler including three tests each being performed in an arrangement including: a room with nominally eight feet generally horizontal or flat ceiling and simulated furniture, the arrangement defining a rectangular-shaped coverage area with first and second parallel walls whose length are longer than third and fourth walls that extend orthogonally to each of the first and second walls, the third and fourth walls being provided with a first opening with 35 inches of width and a second opening with 41 inches of width, the tests including two sprinklers spaced apart over a first distance to provide liquid distribution over the coverage area and a third sprinkler proximate the second opening, the simulated furniture is oriented in an orthogonal configuration so as to generally surround a wood crib, one corner of the coverage area being distal to the first opening; a first thermocouple being located 0.25 inches above the ceiling and 10 inches diagonally from the one corner; a second thermocouple being located in the geometric center of the room and three inches below the ceiling; a first of the fire testing arrangements being for a vertically-oriented type sprinkler, a third thermocouple being located three inches below the ceiling and eight inches from a first sprinkler in the first testing arrangement located nearest the simulated furniture, the first sprinkler being located at a distance L from a second sprinkler in the first testing arrangement so that the first sprinkler is located at one-half L from the third wall with the first opening, a third sprinkler in the first testing arrangement being located three feet from the second wall and four inches from the second opening; a second of the fire testing arrangements being for horizontally-oriented type sprinklers, first and second sprinklers in the second testing arrangement being mounted in the wall distal to the simulated furniture and spaced apart over a distance W so that the first sprinkler in the second testing arrangement is nearest the first opening and located at a distance of one-half W to the third wall having the first opening, the second sprinkler being about nominally eight feet from a third sprinkler mounted on the third wall, and a third thermocouple of the second testing arrangement being located directly across from the first sprinkler of the second testing arrangement at a distance of one-half the width of the room, at three inches below the ceiling and 5 feet and one-quarter inches above the floor; and a third of the fire testing arrangements being for horizontally-oriented type sprinklers, first and second sprinklers of the third fire testing arrangement being mounted in the wall proximal to the simulated furniture and spaced apart over a distance W along the proximal wall, a third thermocouple of the third testing arrangement being located directly across from the first sprinkler of the third testing arrangement at a distance of one-half the width of the room, at three inches below the ceiling and 5 feet and one-quarter inches above the floor, wherein when further in the first, second, and third testing arrangements, a fire source is ignited in accordance with UL Standard 1626 (October 2003), the residential fire sprinklers provide, in a maximum water delivery time of fifteen seconds of actuation of at least one sprinkler, a predetermined water flow rate over the coverage area to limit the maximum temperature measured by the second and third thermocouples to less than or equal to 600 degrees Fahrenheit (F.), the maximum temperature measured by the third thermocouple to be less than or equal to 200 degrees F. and less than or equal to 130 degrees F. for any continuous duration of more than two minutes, the maximum temperature measured by the first thermocouple being less than or equal to 500 degrees F.*

*104. The system of claim 100, wherein the first time period comprises about 10 seconds.*

*105. The system of claim 100, wherein the first time period comprises about 15 seconds.*

*106. The system of claim 100, wherein the residential fire sprinklers include a residential pendant type fire sprinkler having a rated K-factor of at least nominally 4.*

*107. The system of claim 100, wherein the residential fire sprinkler comprises a residential sidewall sprinkler having a rated K-factor of at least nominally 4.*

*108. A residential dwelling unit fire protection system, the residential dwelling unit having a plurality of compartments as defined in the 2002 National Fire Protection Association Standard 13D, the fire protection system comprising:*

*a supply of pressurized fluid located proximate the dwelling unit;*

*a network of pipes in fluid communication with the fluid supply, the network of pipes including at least one pipe extending over each of the compartments, the at least*

*one pipe being filled generally with a pressurized gas consisting of air, nitrogen or a combination thereof so that the at least one pipe is dry; and*

*a quantity of residential fire sprinklers located adjacent each of the compartments, each of the quantity of residential fire sprinklers having a body with an inlet, an outlet defining a passageway between the inlet and the outlet along a sprinkler axis, a deflector affixed to the body so as to be spaced from and generally aligned with the outlet and the sprinkler axis, a closure positioned proximate the outlet and a heat responsive trigger to retain the closure proximate the outlet and occlude the passageway so that the passageway is filled with the pressurized gas when the residential sprinkler is coupled to the at least one pipe filled with the pressurized gas and the heat responsive trigger is in an unactuated condition so that, upon actuation of at least one fire sprinkler of the quantity of residential fire sprinklers, fluid is delivered from fluid supply to the compartments within a first time period, wherein the quantity of residential fire sprinklers is based on a calculated hydraulic demand for all residential fire sprinklers in a wet fire protection system, up to two sprinklers, having the highest calculated demand within a compartment.*

*109. A residential dwelling unit fire protection system, the residential dwelling unit having a plurality of compartments as defined in the 2002 National Fire Protection Association Standards 13 and 13R, the fire protection system comprising:*

*a supply of pressurized fluid located proximate the dwelling unit;*

*a network of pipes in fluid communication with the fluid supply, the network of pipes including at least one pipe extending over each of the compartments, the at least one pipe being filled generally with a pressurized gas consisting of air, nitrogen or a combination thereof so that the at least one pipe is dry; and*

*a quantity of residential fire sprinklers located adjacent each of the compartments, each of the quantity of residential fire sprinklers having a body with an inlet, an outlet defining a passageway between the inlet and the outlet along a sprinkler axis, a deflector affixed to the body so as to be spaced from and generally aligned with the outlet and the sprinkler axis, a closure positioned proximate the outlet and a heat responsive trigger to retain the closure proximate the outlet and occlude the passageway so that the passageway is filled with the pressurized gas when the residential sprinkler is coupled to the at least one pipe filled with the pressurized gas and the heat responsive trigger is in an unactuated condition so that, upon actuation of at least one fire sprinkler of the quantity of residential fire sprinklers, fluid is delivered from fluid supply to the compartments within a first time period, wherein the quantity of residential fire sprinklers is based on a calculated hydraulic demand for all residential fire sprinklers in a wet fire protection system, up to four sprinklers, having the highest calculated demand within a compartment.*

*110. The system of any one of claims 108 and 109, wherein the first time period comprises about 15 seconds.*

*111. The system of any one of claims 108 and 109, wherein the residential fire sprinklers include a residential pendant type fire sprinkler having a rated K-factor of at least nominally 4.*

*112. The system of any one of claims 108 and 109, wherein the residential fire sprinkler comprises a residential sidewall sprinkler having a rated K-factor of at least nominally 4.*

* * * * *